Oct. 24, 1961   J. V. JOHANSEN ET AL   3,005,298
WRAPPING MACHINE
Filed Aug. 19, 1959   13 Sheets-Sheet 5
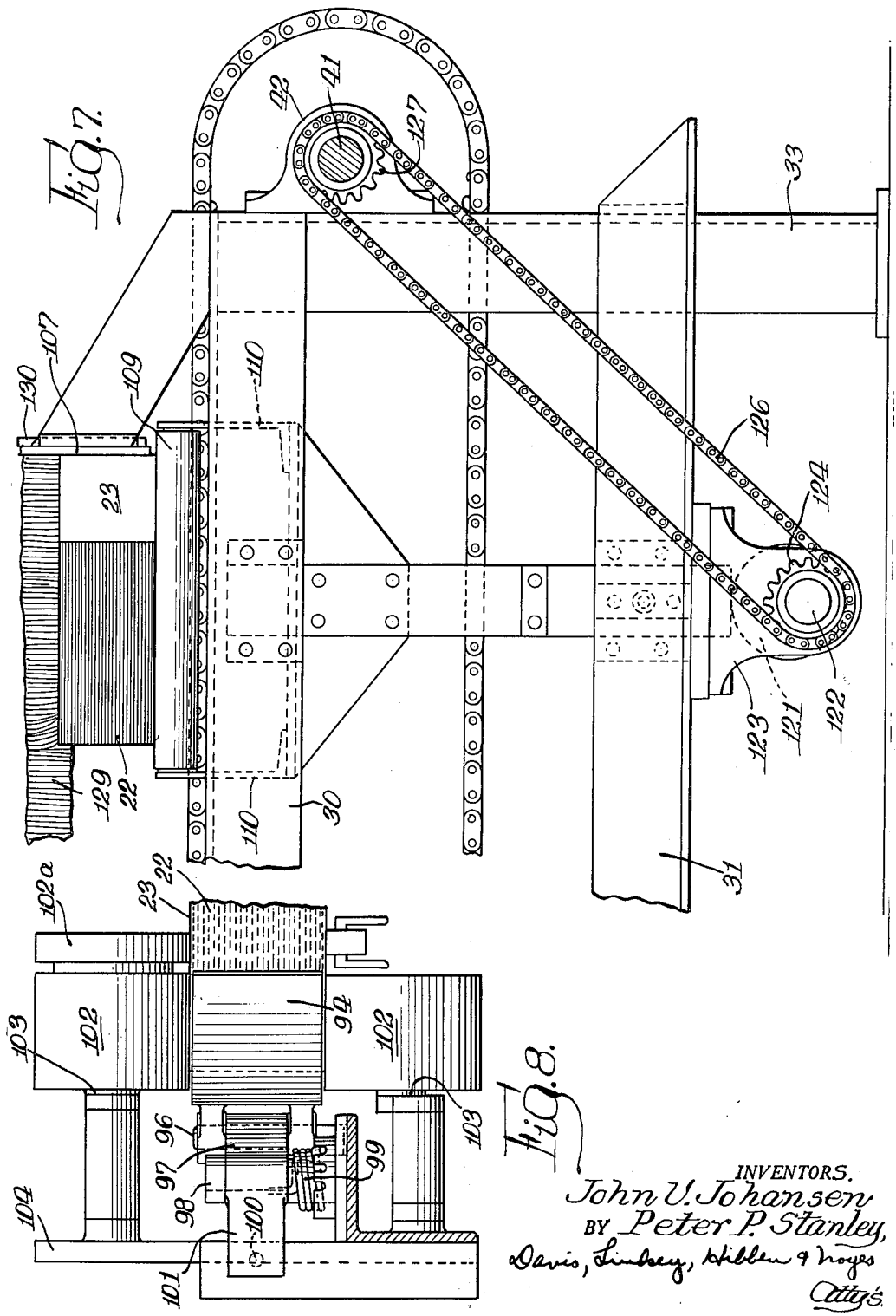
INVENTORS.
John V. Johansen
BY Peter P. Stanley,
Davis, Lindsey, Hibben & Noyes
Attys.

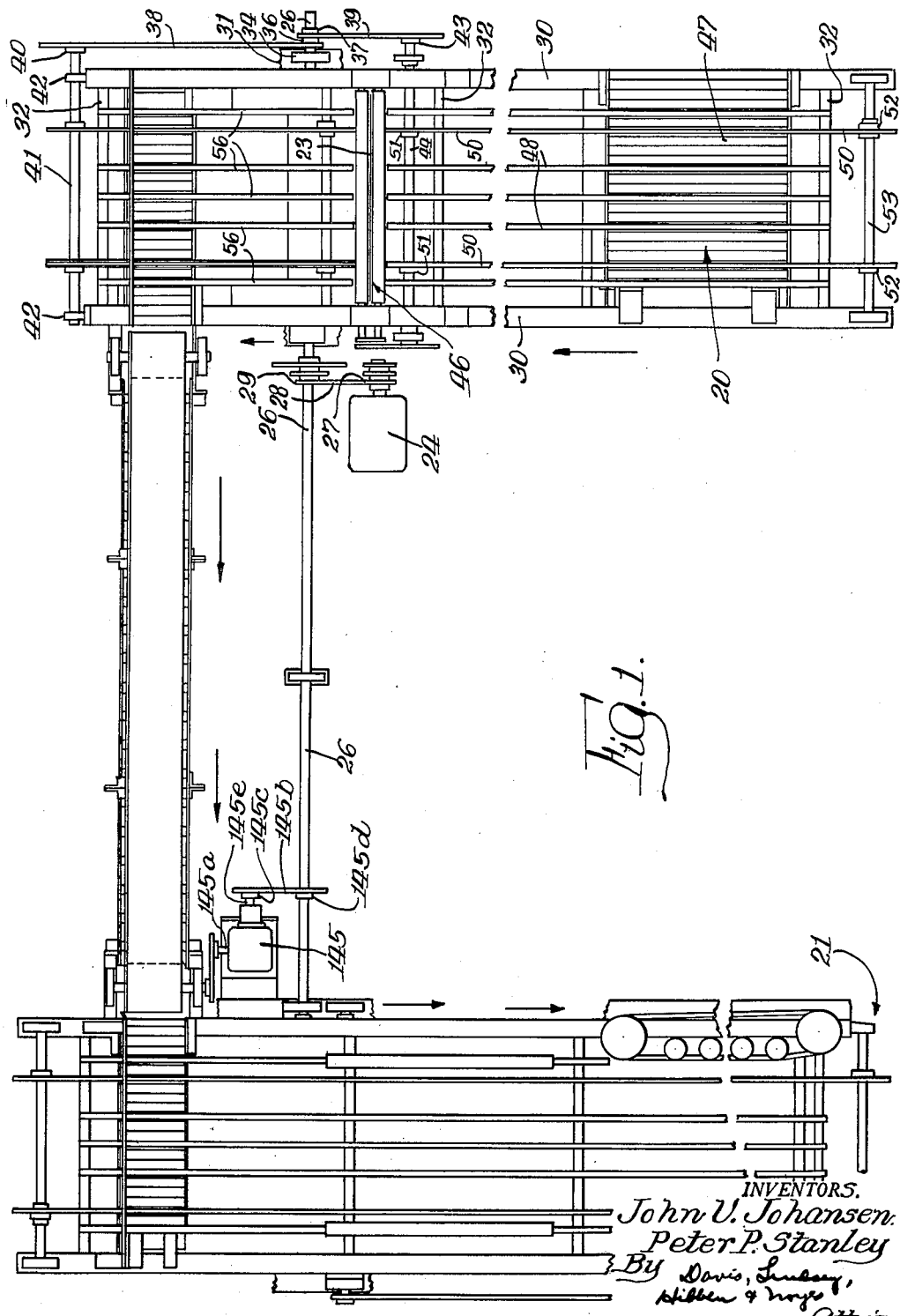

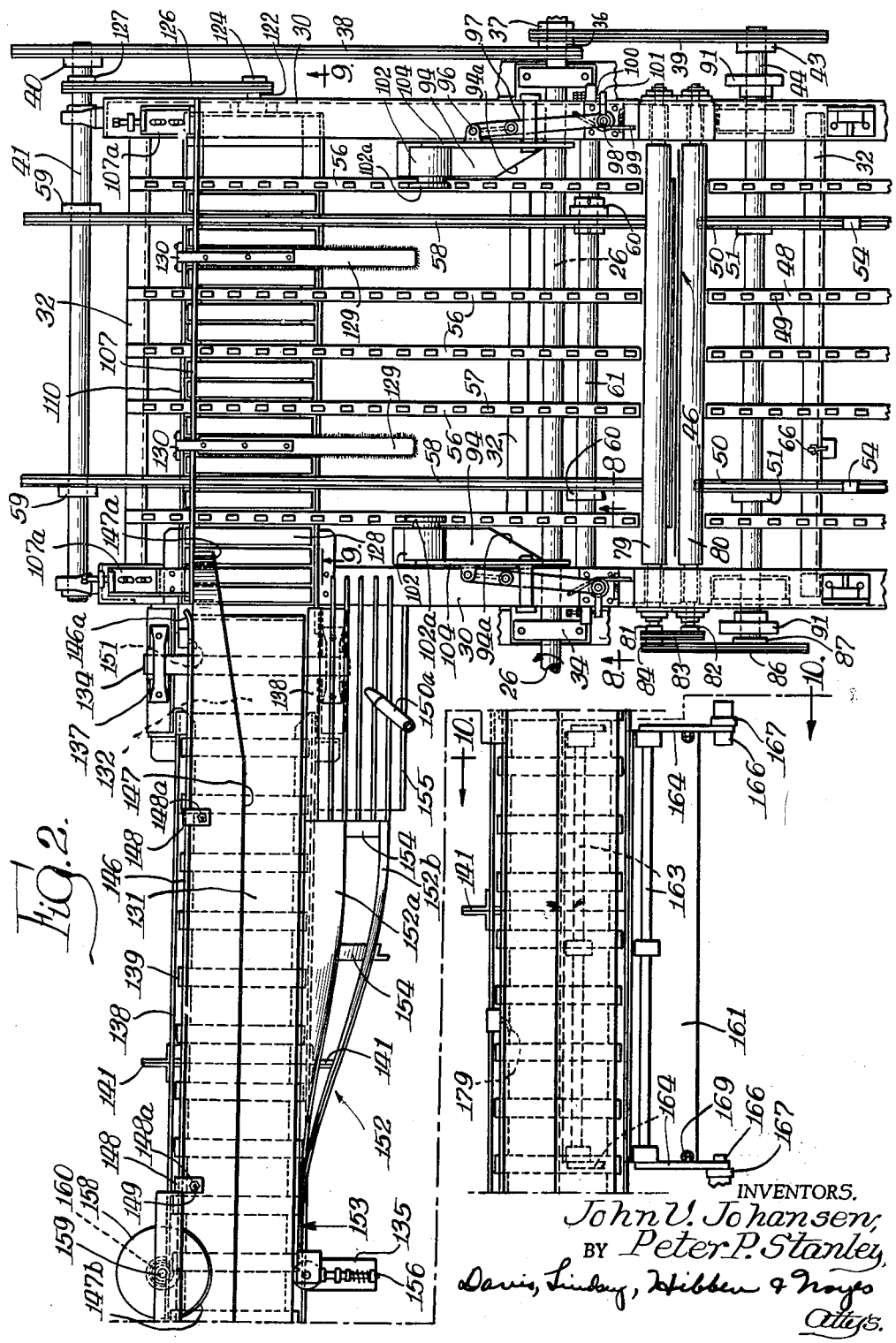

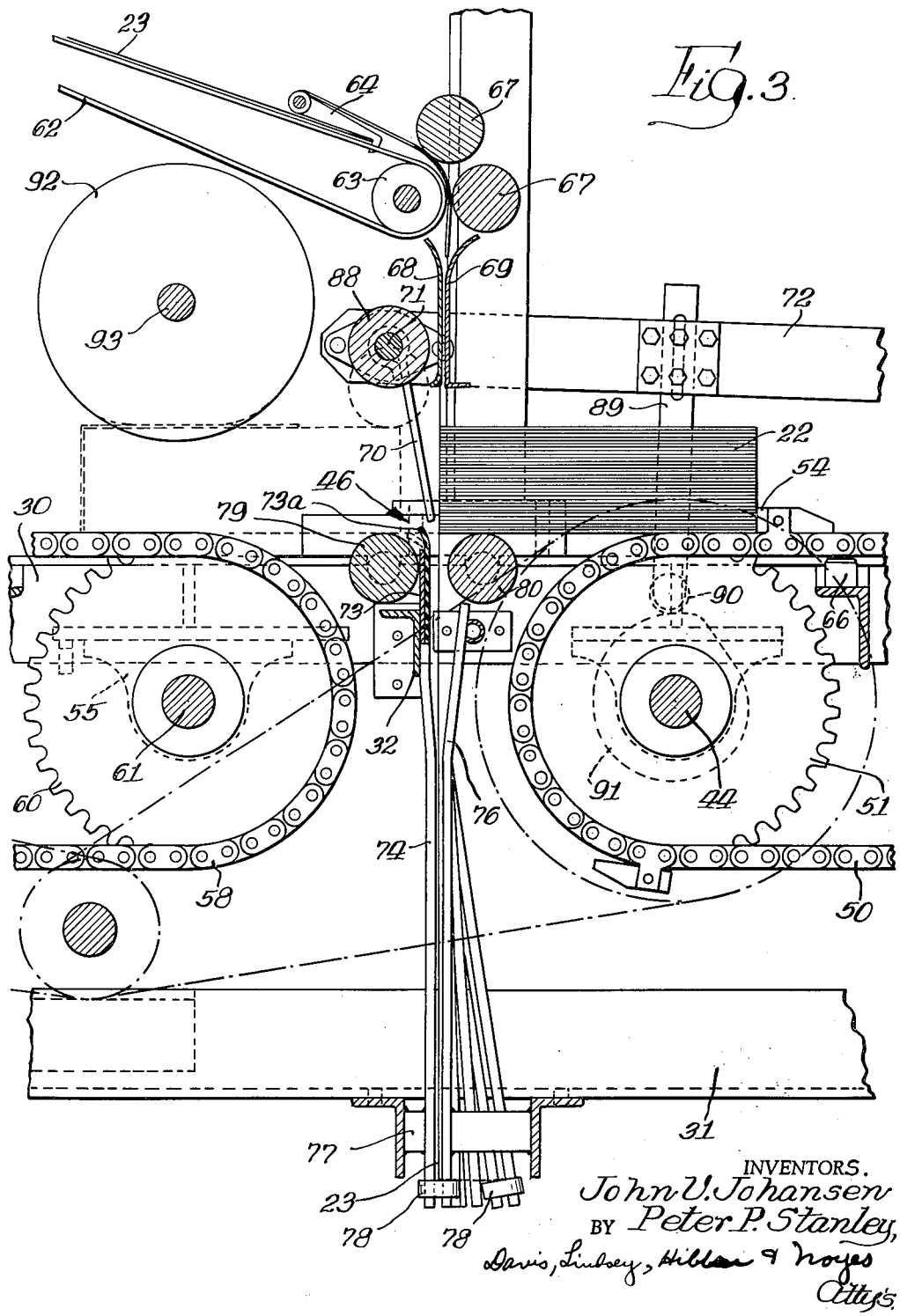

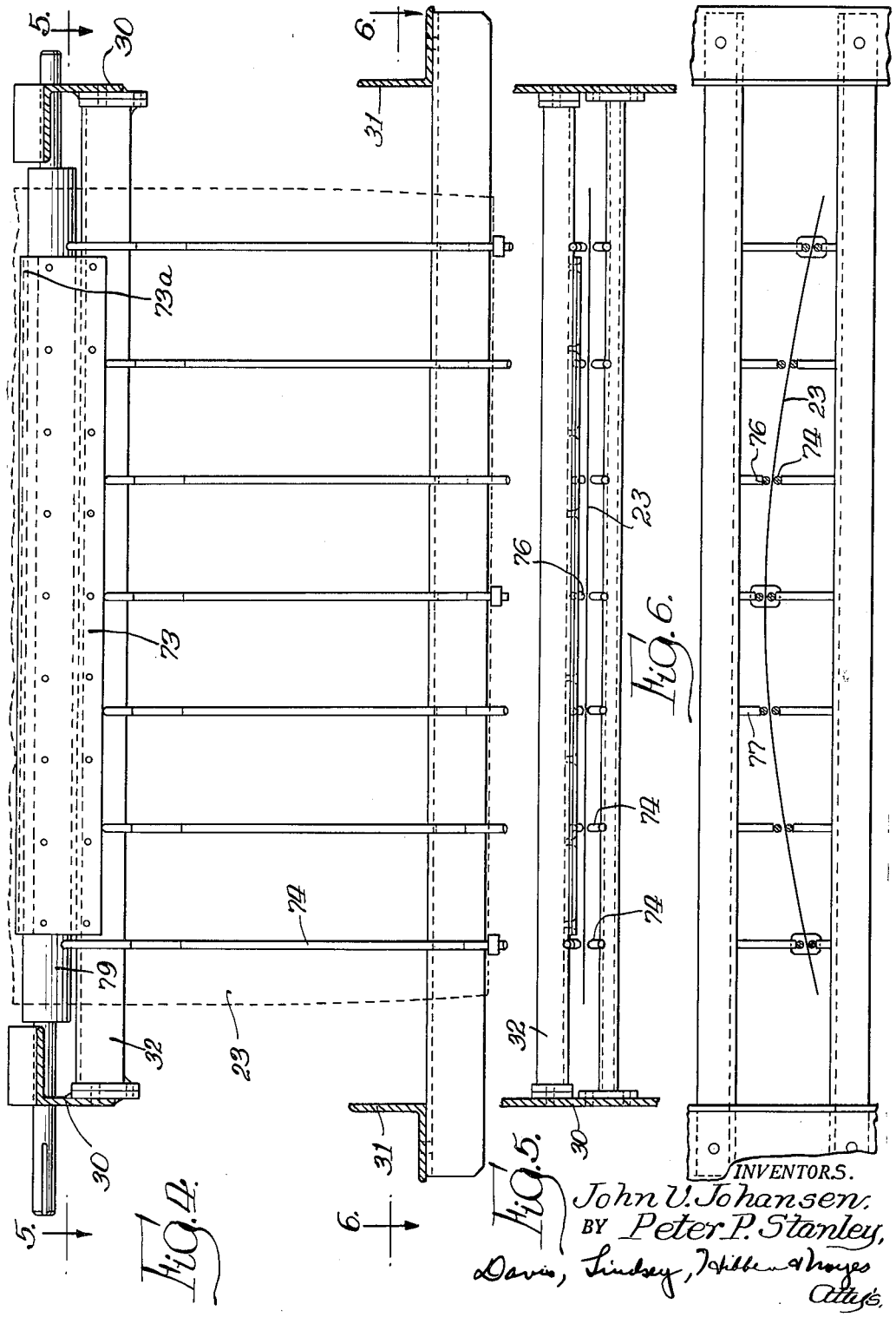

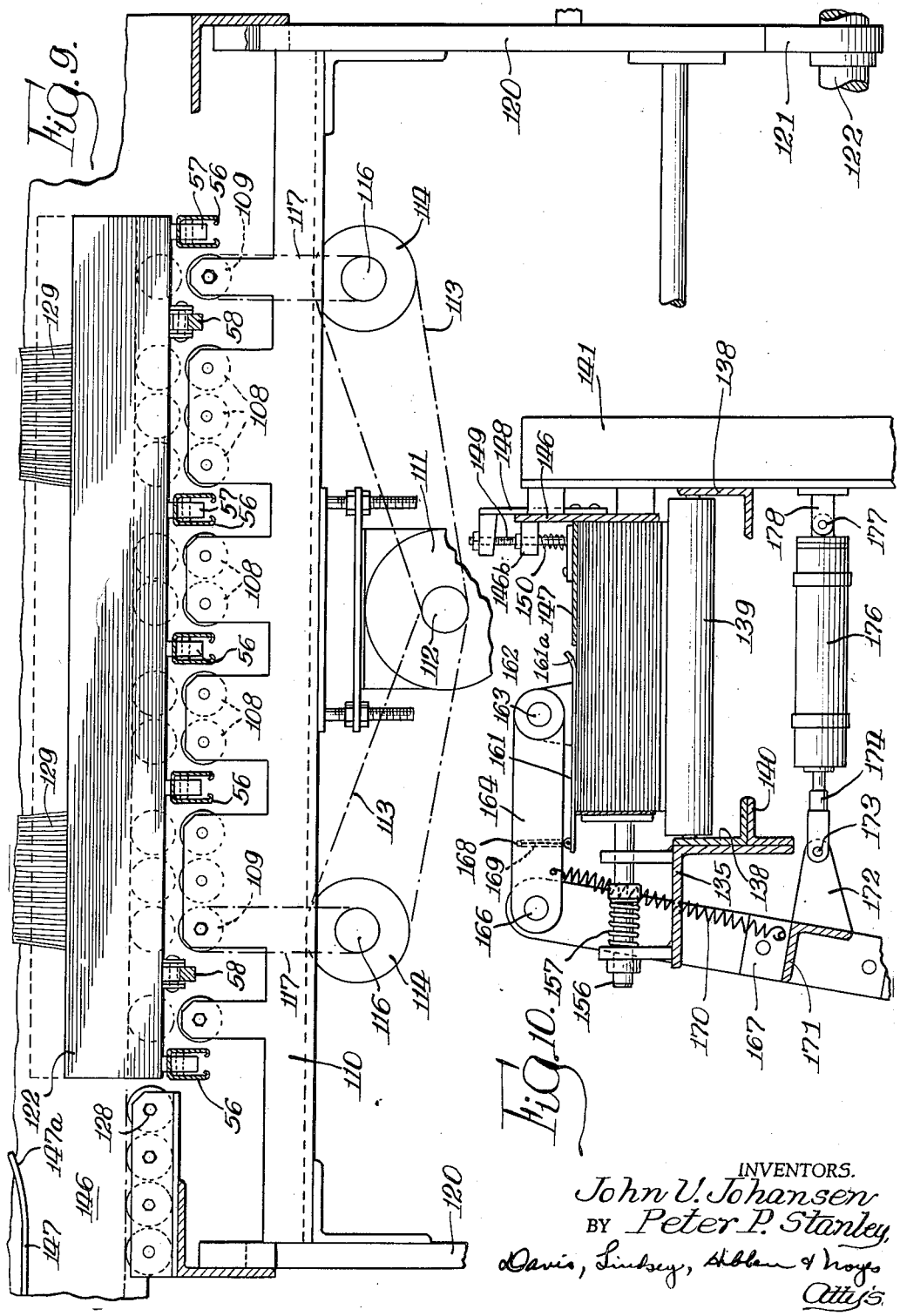

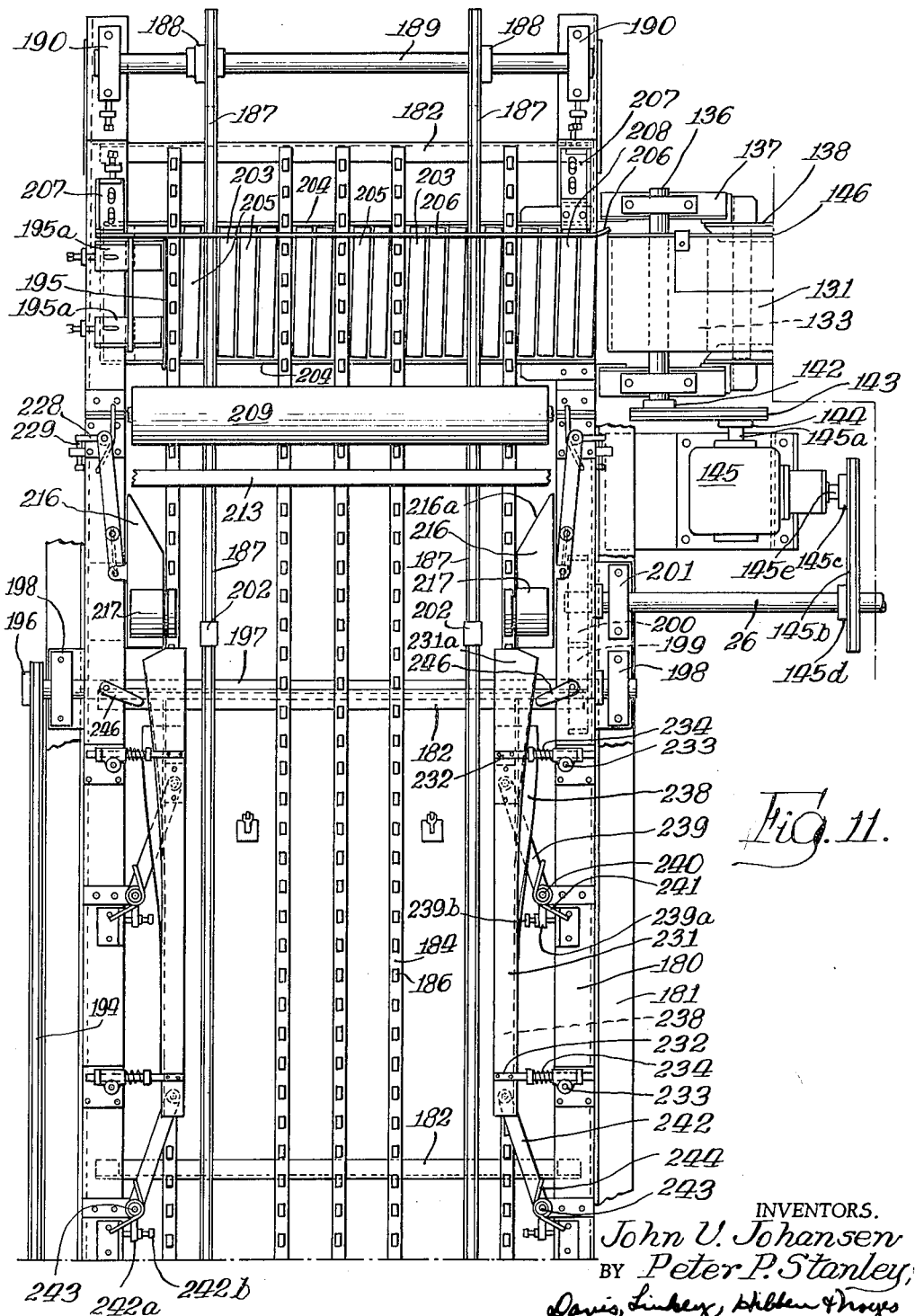

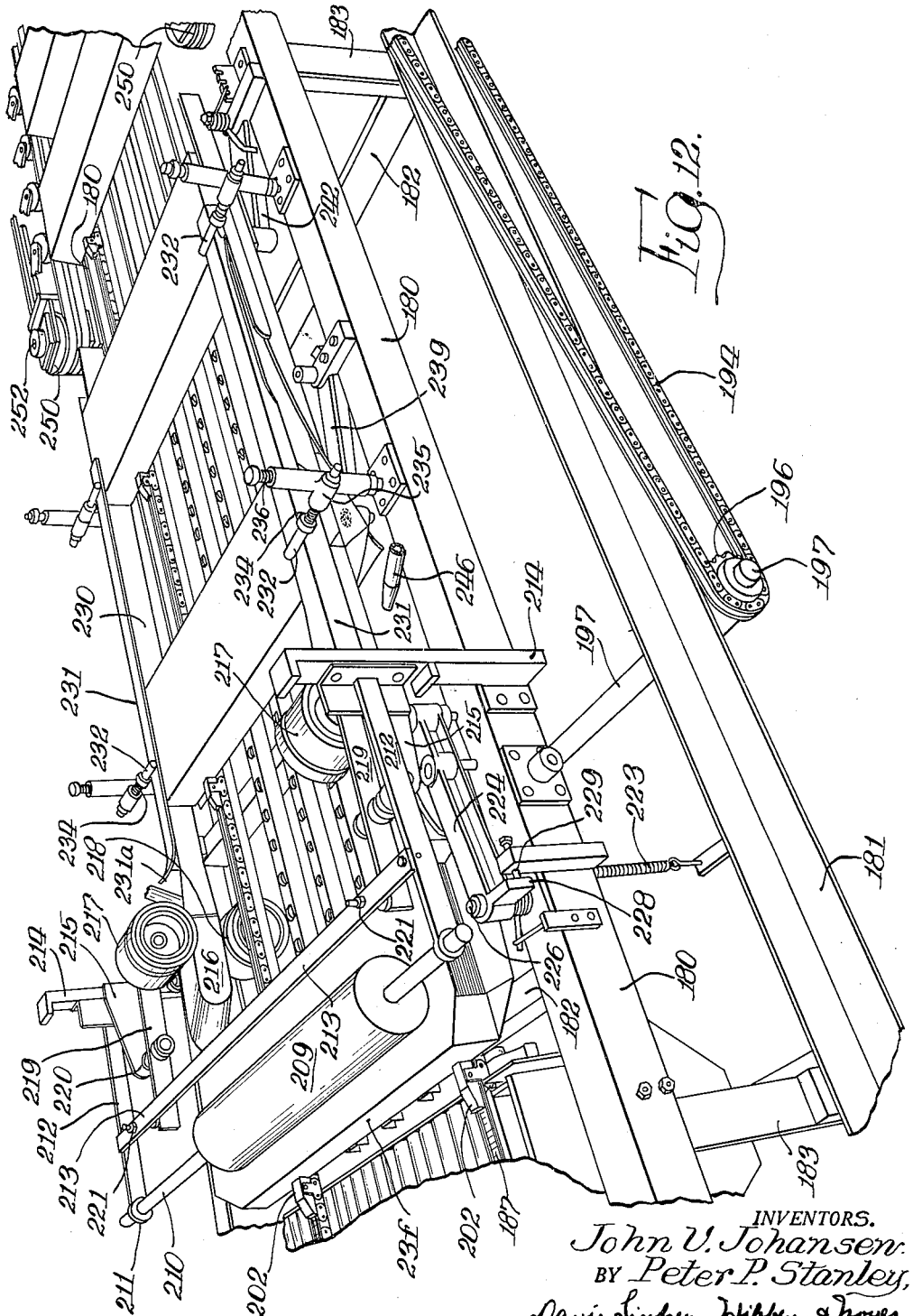

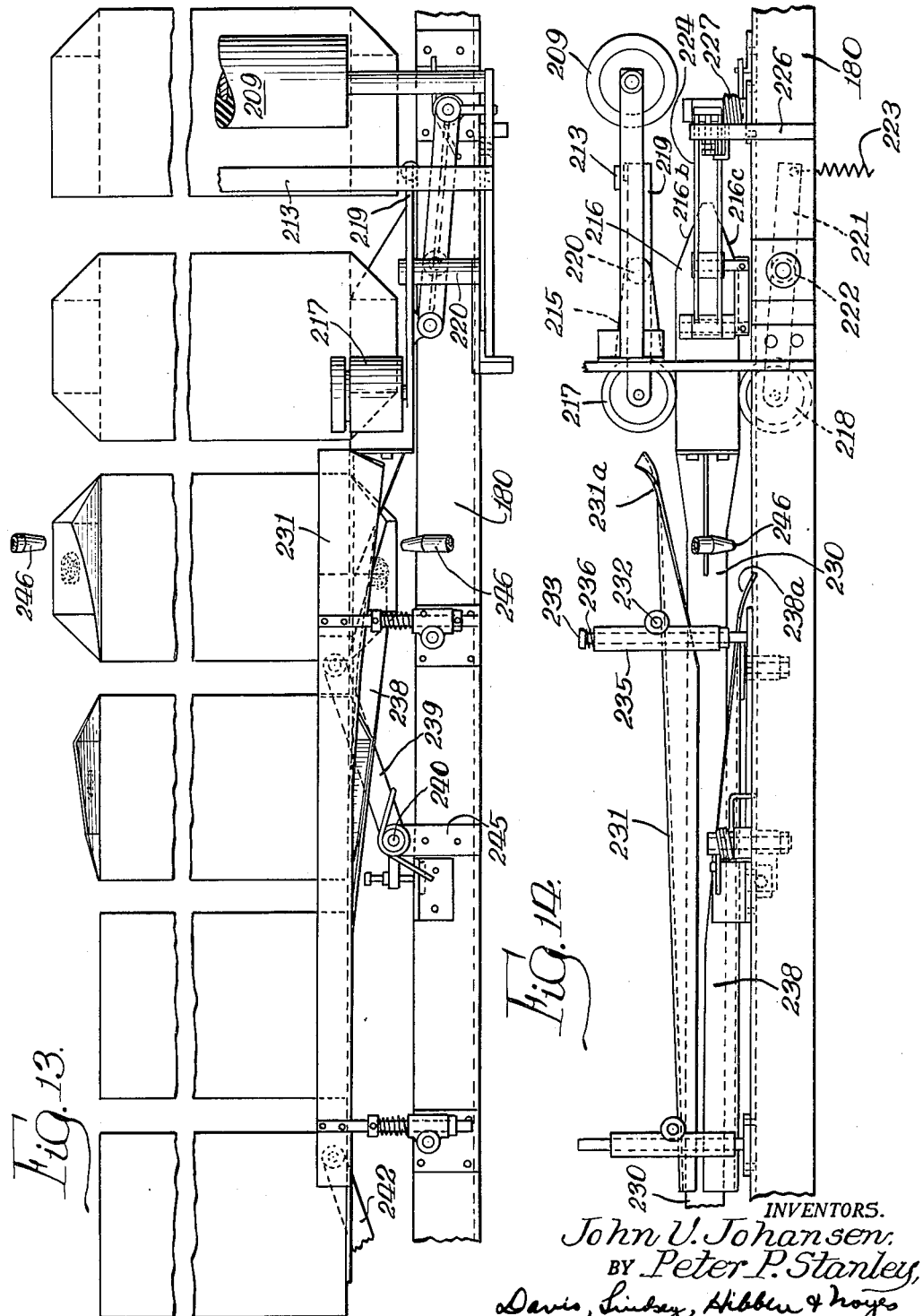

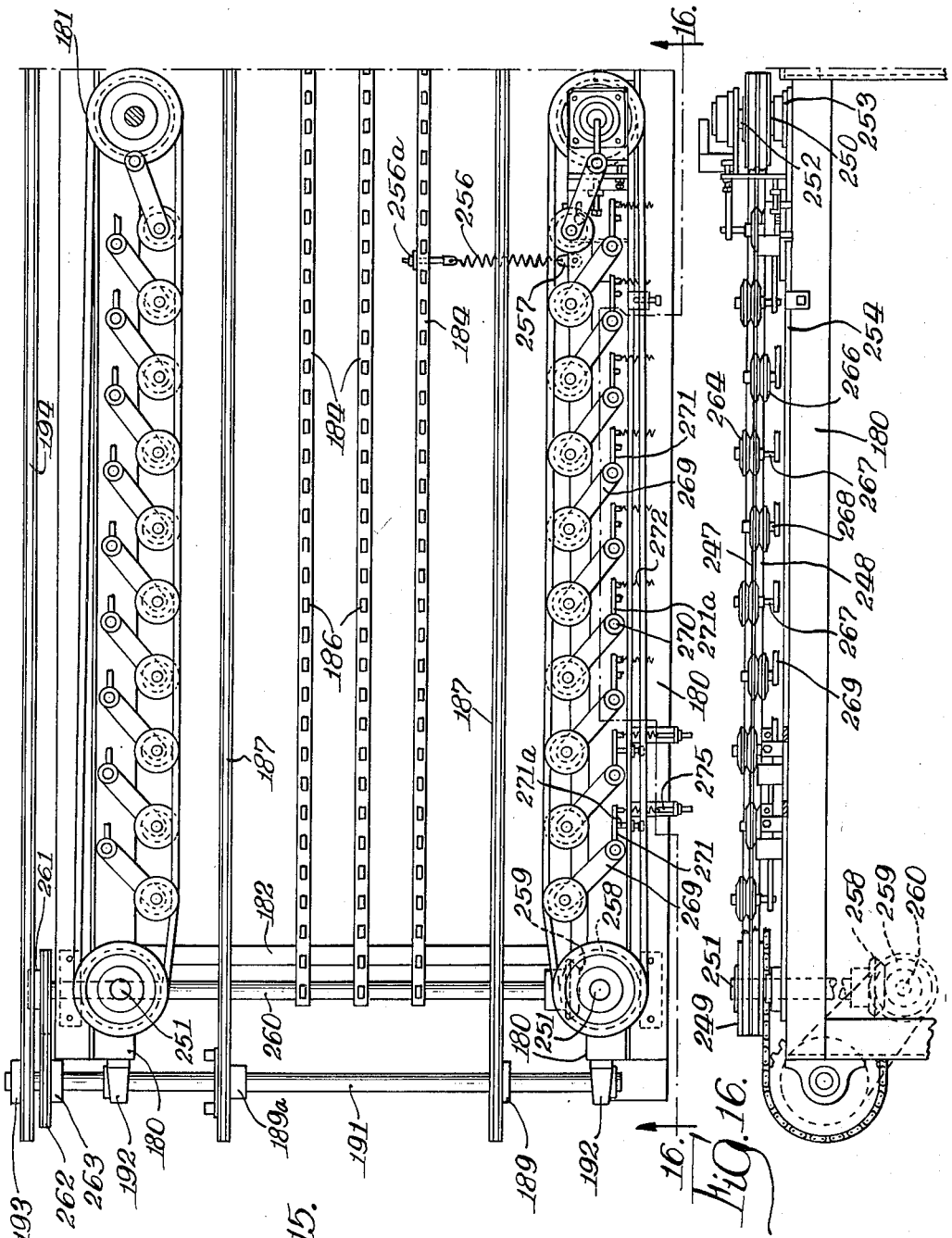

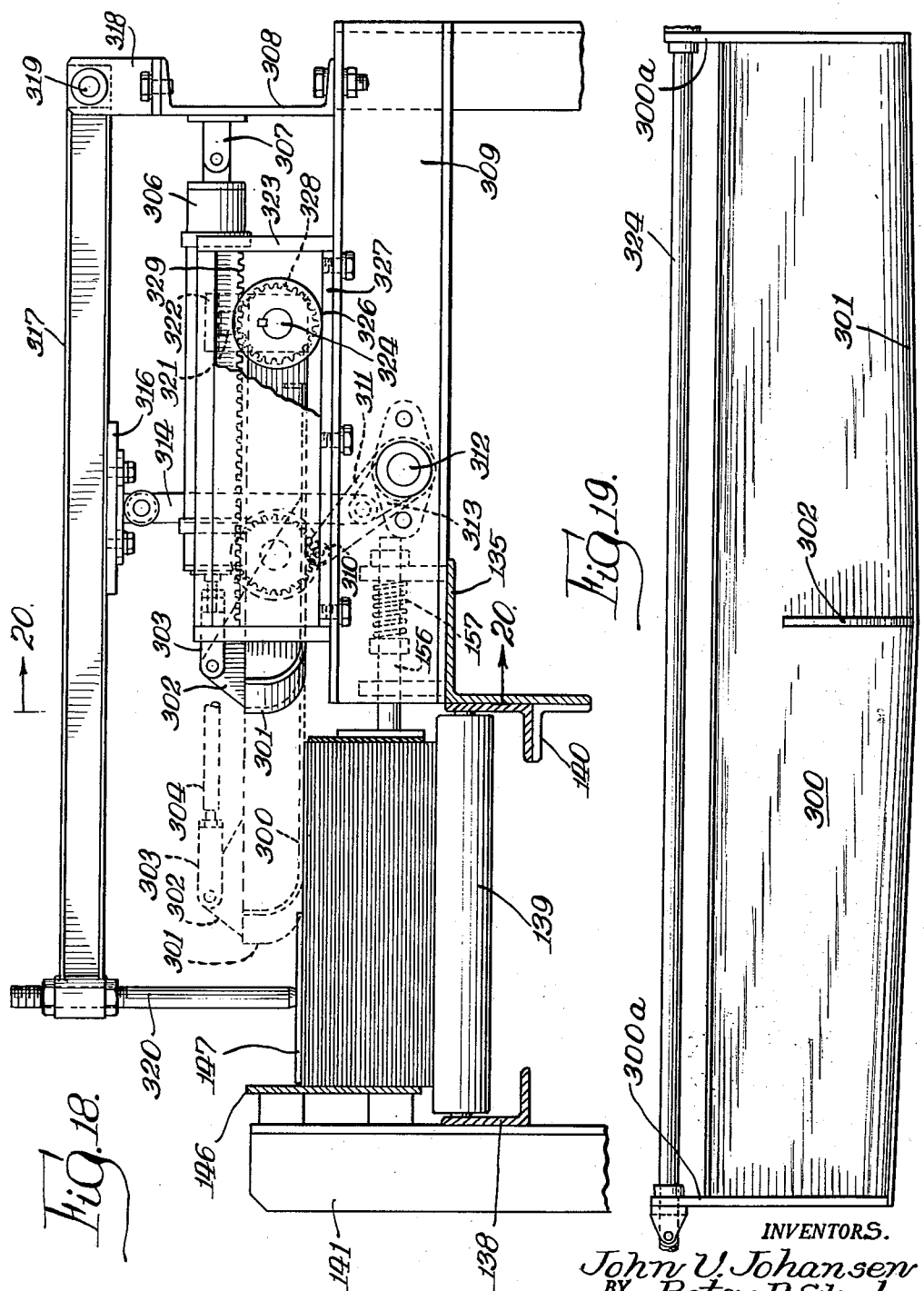

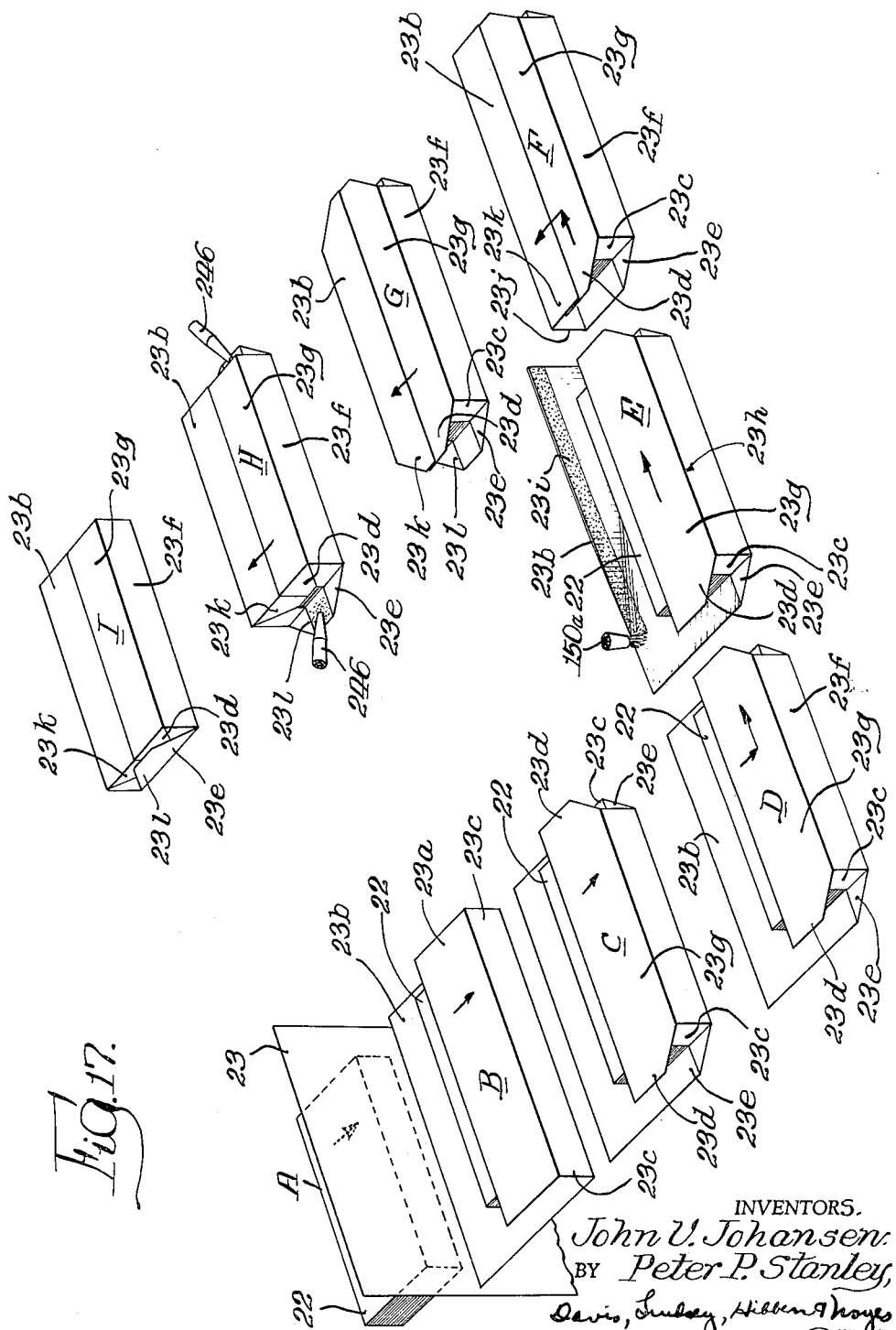

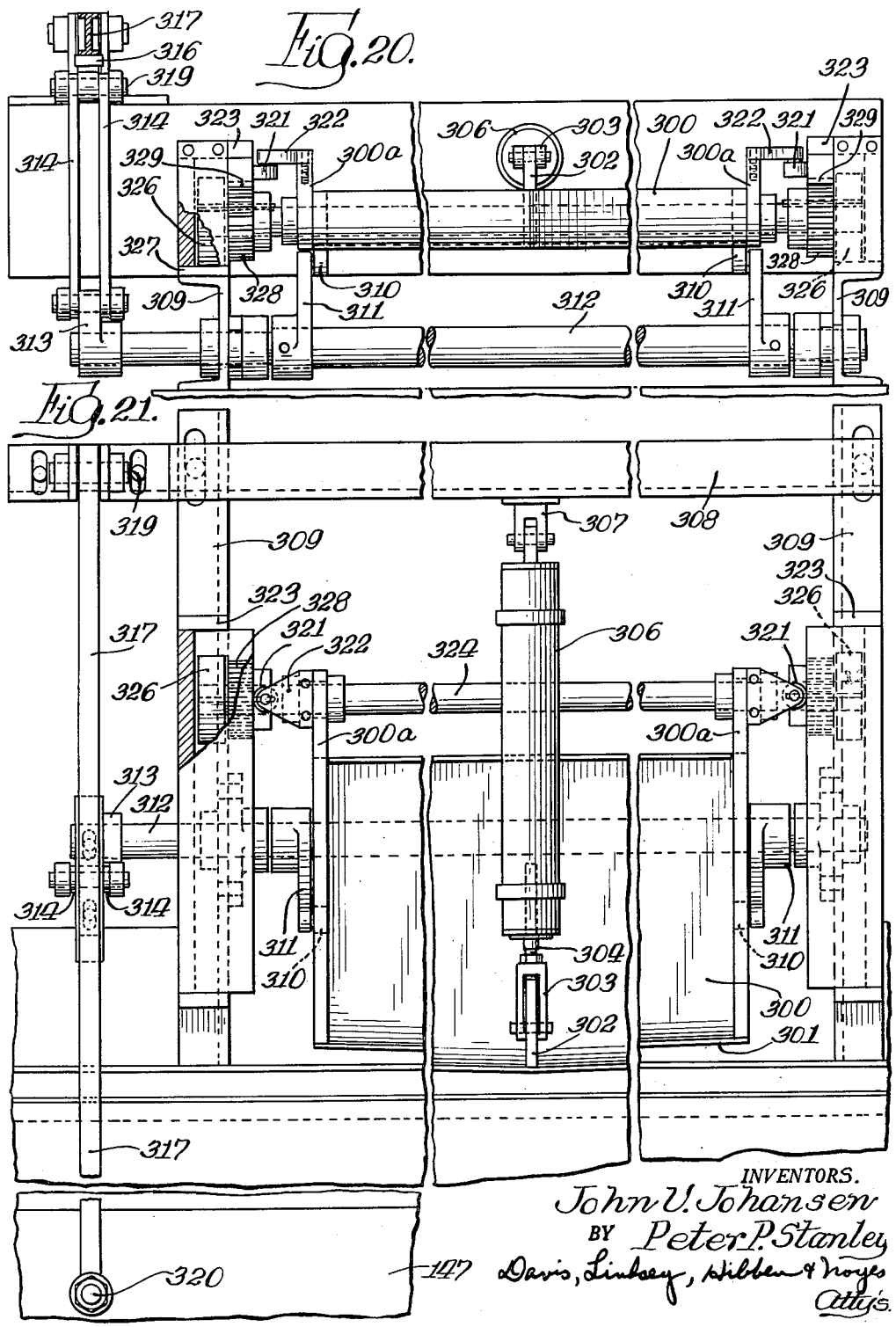

United States Patent Office 3,005,298
Patented Oct. 24, 1961

3,005,298
WRAPPING MACHINE
John V. Johansen, Winnetka, and Peter P. Stanley, River Forest, Ill., assignors to Reichel & Drews, Inc., Chicago, Ill., a corporation of Illinois
Filed Aug. 19, 1959, Ser. No. 834,696
26 Claims. (Cl. 53—224)

This invention relates to wrapping machines and more particularly to automatically operable wrapping machines for applying and sealing a protective sheet about an object in the shape of a cube or a rectangular parallelepiped or about a stack or group of articles comprising such a shape to form a neatly-folded package.

Heretofore, there have been devised wrapping machines of various types having different adaptations and uses but none has been found capable of wrapping in a satisfactory and commercially acceptable manner objects in the shape of a rectangular parallelepiped or a stack of relatively thin sheet-like articles comprising such a shape. For example, in the manufacture of asphalt shingles used for roofing and siding, it is desirable that the shingles as they come off the production line be wrapped for shipment in order that they may be handled as units thereafter in their sale and delivery to the ultimate consumer and in order that they may be protected from dirt, dust, moisture and adverse weather conditions. However, for want of an acceptable wrapping machine, the shingle manufacturing industry has continued to use old unsatisfactory methods, one, for example, being the use of a length of corrugated paper which was wrapped only around the sides and top and bottom surfaces of the stack of shingles and bound with wire, leaving the end edges of the shingles exposed. It frequently happened that such inadequately wrapped shingle packages were stored under unclean conditions or were delivered to a construction job in advance of use where they were exposed to dirt, dust, rain and snow with the result that the shingles became soiled or encrusted with foreign material. It was also the fact that the binding wire frequently cut through the corrugated paper and into the shingles, damaging the same.

It is, therefore, an object of the present invention to provide a wrapping machine whereby objects or groups or stacks of objects may be wholly covered automatically and sealed with a protective sheet in a rapid manner to form a neat package whereby the contents are protected from dirt and unfavorable conditions.

Another object of the invention is to provide a wrapping machine of the foregoing character adapted to wrap objects or stacks or groups of articles that are in the general shape of a rectangular parallelepiped.

Still another object is to provide a wrapping machine of the foregoing character which is efficient and reliable in its automatic operation and which requires a minimum of attention by an operator during operation.

A further object is to provide a wrapping machine of the foregoing character which may be adjusted to handle objects of different sizes so as to afford a wide range of use.

Other and further objects and advantages of the present invention will become apparent as this description progresses, reference being had to the accompanying drawings, in which:

FIG. 1 is a general plan view of an automatic wrapping machine, comprising a preferred embodiment of the present invention;

FIG. 2 is an enlarged top plan view showing those portions of the automatic wrapping machine of FIG. 1 wherein an object in the shape of a rectangular parallelepiped illustrated as a stack of shingles first engages a sheet of paper with which it is to be wrapped and comprising the first, second and third sheet folding stages;

FIG. 3 is a vertical sectional view of the mechanism at the paper sheet feeding and positioning zone of the wrapping machine showing the manner in which the paper sheet is disposed in the path of movement of the object to be wrapped;

FIG. 4 is a front elevational view of the lower portion of the paper sheet positioning and supporting mechanism illustrated in FIG. 3;

FIG. 5 is a horizontal sectional view taken on the line 5—5 of FIG. 4, looking downwardly in the direction of the arrows;

FIG. 6 is a horizontal sectional view taken on the line 6—6 of FIG. 4, looking downwardly in the direction of the arrows;

FIG. 7 is an enlarged end view of the mechanism for raising a plurality of conveyor rollers above the conveyor chains after the first paper sheet folding operation whereby the partially wrapped object is caused to move at right angles to the initial direction of movement and to pass to the left as viewed in FIGS. 1 and 2;

FIG. 8 is a partial vertical sectional view taken on the line 8—8 in FIG. 2, looking in the direction of the arrows;

FIG. 9 is a transverse view of the portion of the mechanism shown in FIG. 8 of the drawings, taken on the line 9—9 in FIG. 2 looking in the direction of the arrows;

FIG. 10 is a transverse, vertical sectional view of the mechanism for effecting the third folding operation on the paper sheet, taken on the line 10—10 of FIG. 2 looking in the direction of the arrows;

FIG. 11 is an enlarged top plan view of those portions of the wrapping machine wherein the final folding and sealing operations are acccomplished;

FIG. 12 is a perspective view of those portions of the machine illustrated in FIG. 1, looking at the machine from the upper left corner of FIG. 11;

FIG. 13 is an enlarged partial and somewhat diagrammatic top plan view showing the mechanism on one side only of the conveyor system whereby the final gluing and folding operations are performed;

FIG. 14 is a side elevational view of the mechanism shown in FIG. 13 of the drawings;

FIG. 15 is a top plan view of the mechanism of the final stage of the wrapping machine wherein pressure is continuously exerted on the folded, glued flaps of the ends of the package to seal the same;

FIG. 16 is a vertical sectional view of the mechanism shown in FIG. 15 of the drawings taken on the line 16—16 in FIG. 15;

FIG. 17 is a diagrammatic view showing the position of the paper wrapping sheet about the object being wrapped in its various stages of folding and gluing, the path of movement through the machine being indicated by the arrangement of the package and by the direction of the arrows;

FIG. 18 is a side elevational view of a modified form of reciprocating folding shoe mechanism which may be substituted for that shown in FIG. 10 of the drawings;

FIG. 19 is a top plan view of the folding shoe shown in FIG. 18;

FIG. 20 is a vertical sectional view taken on the line 20—20 in FIG. 18, looking in the direction of the arrows; and FIG. 21 is a top plan view of the mechanism shown in FIG. 18.

The automatic wrapping machine embodying the features of the present invention and constituting a preferred embodiment thereof is shown generally in a plan view in FIG. 1 of the drawings and comprises a conveyor mechanism arranged in an inverted U or channel shape. An object in the general shape of a rectangular parallelepiped, such as a stack of shingles to be wrapped, enters the machine at the entry zone designated generally by the numeral 20 at the top of one vertical leg of the U and passes along the conveyor in the direction of the arrows until it is in alignment with the bottom or lateral part of the U. When so aligned, the stack is then moved laterally to the left in a right angle turn by the conveyor in the direction of the arrows until it becomes aligned with the bottom of the other vertical leg of the U, at which point it again changes direction by a substantially right angle turn and passes in the direction of the arrows to the outer end of the leg to the exit zone designated generally by the numeral 21. As the stack of singles passes around the U-shaped conveyor machine, a sheet of paper is wrapped and securely sealed about the stack in various folding stages, this wrapping operation being completed when the stack reaches the exit zone 21.

In FIG. 17 of the drawings, a stack of shingles 22 and a sheet of wrapping paper 23 are shown diagrammatically with the paper sheet illustrated in its various stages as it is being folded and wrapped about the stack in progressing through the machine in the direction of the arrows. The substantially U-shaped arrangement of the plurality of stacks 22 and paper sheets 23 corresponds in diagrammatic fashion with the U-shaped arrangement of the machine in FIG. 1 and may be referred to for clear illustration of the folds and seals being accomplished by the mechanism of the various stages and positions to be described in detail hereinafter.

Referring to FIG. 1, the primary source of power for operating the wrapping machine is an electric motor 24 which drives the main power shaft 26 through a sprocket 27, a chain 28 and a sprocket 29 fixed on the shaft 26. The main shaft 26 extends in parallel relation with the bottom or lateral portion of the U of the conveyor and transmits the driving power for the conveyor units and mechanism on both the leg portions and the lateral portion of the U-shaped machine. The frame of the machine portion extending from the entry zone 20 to the lateral portion thereof and forming the one or first vertical leg of the U comprises upper horizontal side frame members 30 and lower horizontal side frame members 31 (FIGS. 1, 2, 3 and 9) secured together by transverse tie bars 32 and supported at their ends and at spaced points between the ends by perpendicular legs 33. The main shaft 26 extends transversely through this portion of the machine where it is journalled in bearings 34 carried on the lower side frame members 31, as shown in FIGS. 1 and 2.

The right end of the power shaft 26 extends outwardly beyond the right side frame members 30 and 31 and on this end between the sprocket 29 and the frame members are fixed two spaced sprockets 36 and 37 which drive chains 38 and 39, respectively. The chain 38 extends rearwardly over a sprocket 40 fixed on the right end of a transverse shaft 41 journaled in spaced bearing blocks 42 carried on the frame, as shown in FIGS. 1, 2 and 7. The chain 39 also extends forwardly from the power shaft 26 and around a sprocket 43 secured in the right end of a transverse shaft 44 journaled in the machine frame. By the aforesaid arrangement, power is transmitted simultaneously from the main power shaft 26 to the transverse driving shaft 41 and 44 from which are continuously driven the conveyor mechanism disposed on the approach side and on the exit side of the paper receiving and applying station indicated generally by the numeral 46 and shown in cross-sectional detail in FIG. 3.

As shown more particularly in FIGS. 1 and 2 of the drawings, the conveyor apparatus from the entry end of the machine up to the paper receiving and applying station 46 comprises a plurality of longitudinally disposed idler or driven rollers 47 mounted on longitudinally extending axes at the entry end 20 and adapted to receive a stack of shingle fed from the side. The rollers 47 are spaced apart to accommodate elongated channel-shaped roller units 48 having a plurality of idler rollers 49 rotatably mounted therein. The roller units 48 are supported on the transverse tie bars 32 and terminate closely adjacent the paper station 46. The entry conveyor apparatus also includes two spaced endless chains 50 which extend around sprockets 51 fixed in spaced relation on the transverse driving shaft 44 and also around spaced sprockets 52 secured on a cross shaft 53 journalled at the upper part of the frame at the entry end of the machine. The upper horizontal lengths of the loops of the chains 50 are in substantially the same plane as the roller units 48 and they are provided with upstanding lugs 54 secured to the chains 50 at approximately three foot intervals although this spacing may be varied as desired. Hence, when a stack of shingles is rolled into position transversely of the machine onto the entry rollers 47, the lugs 54 on the moving chains 50 will engage the rear bottom edges of the stack of shingles and force the stack forwardly over the roller units 48 into the paper receiving and applying station 46.

Similarly, the stack coveying apparatus on the other side of the paper station 46 comprises a plurality of spaced roller units 56 having plurality of rollers 57 therein, these roller units 56 likewise being supported on the transverse tie bars 32 of the machine frame. Two spaced endless chains 58 extend around sprockets 59 secured in spaced relation on the transverse driving shaft 41 and around similarly spaced sprockets 60 fixed on a transverse shaft 61 journalled at its ends in bearing blocks 55 on the upper side frame members 30, as shown in FIGS 2 and 3. In contrast to the chains 50 of the conveyor apparatus on the approach side of the paper station 46, the chains 58 are not provided with lugs inasmuch as after a stack of shingles 22 has engaged the paper sheet 23 and the sheet has been folded to the condition indicated by the letter B in FIG. 17, the paper sheet 23 trails out behind the bottom of the stack 22 and thus lugs cannot be used to engage the stack 22 at the rear thereof. However, as will be explained more fully hereinafter, pressure members are employed against the top of the stack 22 and driven rollers are also provided on the bottom to convey the stack and the partially folded sheet to the end of the first vertical leg of the U of the machine and into alignment with the lateral portion of the U of the machine for passage to the left. In lieu of the chains 58 or in addition thereto, conveyor belts may also be supplied to support and convey the stack of shingles and the paper sheet beyond the paper station 46.

The paper feeding, receiving and applying mechanism at the station 46 is shown more particularly in FIGS. 2 and 3 of the drawings and may comprise an automatic paper feeding machine, only a portion of which is shown and which may take any form desired for the purpose, having a plurality of endless belts 62 extending over pulleys 63 and also having a plurality of pivoted, hooked fingers 64 adapted to be disposed in the path of movement of the paper sheets 23, as shown in FIG. 3, and to be released by actuation of a solenoid switch 66, located in the path of movement of the stack on the approach side of the paper station 46 (FIG. 2). When the switch arm 66 is tripped by passage of the stack 22 thereover, a solenoid actuates an air valve (not shown) which admits air to an air cylinder (not shown) to cause the paper holding fingers 64 to be released. Upon release by the fingers 64, the paper sheet 23 passes diagonally downwardly between idler rollers 67 and the belt 62 and thence downwardly between spaced guide plates 68 and 69.

Below the guide plates 68 and 69, the downward passage of the sheet 23 is further directed by a plurality of depending spaced guiding strips 70 which are freely pivoted on a cross shaft 71 carried at the ends of spaced horizontal arms 72 pivoted at their right ends to the machine frame, as viewed in FIG. 3. A transverse vertically disposed plate 73 having a curved upper edge 73a is secured to a tranverse tie bar 32 and serves to guide the paper sheet 23 downwardly between two rows of vertical paper supporting bars 74 and 76 which form a paper holder for supporting the paper 23 on its bottom edge in the path of movement of the stack 22. As shown in FIGS. 3 and 6, the lower portions of the bars 74 and 76 are bent and arcuately arranged so that the paper sheet 23 is caused to assume a curvature and thus affording self-supporting strength to the paper sheet and permitting it to stand on its bottom edge without collapse. The bars 74 and 76 are supported at their lower ends by a cross member 77 on the frame and are provided with adjustable stops 78 at their lower ends for engagement with the bottom edge of the paper 23. The stops 78 may be moved up or down in order to accommodate shorter or longer paper sheets which may be varied in size as required by the size of the article or stack being wrapped.

The paper sheets 23 are individually and successively moved into position in the paper station 46 in timed sequence in advance of each successive stack 22. As shown in FIG. 3, the stack 22 is moved forwardly to the left by the chain lugs 54 and the front edge of the stack engages the paper sheet 23 above the center portion of the sheet so that, as shown at B in FIG. 17, when the top portion 23a of the sheet is folded back down on top of the stack it will extend slightly beyond center and the lower portion 23b of the sheet will extend underneath and a considerable extent beyond the rear edge of the stack. The paper sheet 23 is of greater width than the stack 22 to be wrapped and consequently projects beyond the side edges of the stack and provides sheet material to be folded down against the side edges as will be described hereinafter.

Extending transversely across the machine on each side of the paper guide plate 73 at the paper station 46 and in substantially the same plane as chains 50 and 58 are two driven rollers 79 and 80 (FIGS. 2 and 3) journaled in the side frame members 30 and having sprockets 81 and 82 on their respective left ends over which an endless chain 83 extends. The roller 79 has a sprocket 84 over which a chain 86 extends from a sprocket 87 on the left end of the shaft 44. Thus rotation of the shaft 44 will also drive the rollers 79 and 80 through the chain 86, sprocket 84, chain 83 and sprockets 81 and 82. The rollers 79 and 80 assist in conveying the stack 22 through and beyond the paper station 46.

Above the driven rollers 79 and 80 are a plurality of pressure rollers 88 mounted for rotation on the cross shaft 71, these rollers 88 serving to bear down on the top of the stack 22 and the paper sheet 23 when in their lowered position as shown by the broken lines in FIG. 3 and cause the upper portion 23a of the sheet 23 to be folded back on top of the stack in the first folding operation as the stack passes through the paper station. The arm members 72 on which the rollers 88 are carried have depending bars 89 with rollers 90 on their lower ends which engage cams 91 secured adjacent the respective ends of the shaft 44. Upon rotation of the cams 91 with the shaft 44 the pressure rollers 88 are raised and lowered, the lowering occurring when the stack is on top of the driven rollers 79 and 80 and thus enabling the rollers 79 and 80 to push the stack 22 through the paper station onto the chains 58 and the roller conveyor units 56 of the next conveyor section.

As the stack 22 with the paper sheet 23 partially folded thereabout passes onto the chains 58 and the roller units 56 beyond the paper station 46, a downward pressure is also exerted by a plurality of sponge rubber rollers 92 mounted for free rotation on a cross shaft 93 carried on the frame and this pressure serves to hold the paper down on the top of the stack and to hold the stack down against the chains 58 in substantially non-slipping contact for conveyance thereby.

For the purpose of making the folds of the paper sheet 23 indicated at the points 23c on the front leading side edges of the package in accomplishing the second folding operation as it passes from stage B to stage C as shown in FIG. 17, a pair of spaced, folding shoes 94 having inclined paper engaging faces 94a are disposed on the path of movement of the package and the sidewardly extending paper portions 23c, as shown in FIGS. 2 and 8. The shoes 94, which are of substantially the same height as the stack 22, are each pivotally mounted at 96 on the rear end of a supporting arm 97 extending rearwardly from a vertical pivot 98 and they are urged inwardly toward the center of the machine by a spring 99 so as to exert folding and creasing pressure against the paper and the stack. The extent of inward movement of the shoes 94 is limited by an adjustable stop 100 which is engaged by a stop bar 101 fixed on the end of the pivoted arm 97. The stop 100 is so adjusted as to permit the shoes 94 to move inwardly to such an extent that the space between them is normally narrower than the width of the stack passing therebetween. By this arrangement, as the partially wrapped package in the condition B of FIG. 17 is carried by the conveyor beyond the paper station, the sidewardly extending paper sheet portions 23c are engaged by the inclined faces 94a of the shoes 94 and are folded inwardly against the side of the stack and leaving upper and lower flaps 23d and 23e still projecting laterally over the top and bottom surfaces of the shoes 94.

Above and below each folding shoe 94 are freely rotatable, hard-surfaced, pressure idler rollers 102, which bear downwardly and upwardly against the sheet flaps 23d and 23e, respectively, simultaneously as the fold 23c is being made by the shoes so as to crease the folds to the condition C of the wrapping operation. The pressure rollers 102 are rotatably mounted on stub shafts 103 carried on the ends of arms 104 pivoted intermediate their ends to the machine frame. The upper rollers 102 bear down on the paper sheet 23 and the shoes 94 with the force of gravity while the lower rollers 102 bear upwardly against the sheet 23 and shoes 94 under the urge of springs secured between the other free ends of the lower pivoted arms 104 and the frame. Similar shoes and pressure rollers are shown in FIG. 14 of the drawings. The inner ends of the upper roller 102 are each provided with an annular roll or ring 102a comprised of soft sponge rubber which frictionally engage the upper surfaces of the paper sheet 23 and the stack 22 as they are moved by the conveyor through this second folding station and hence cause the upper rollers 102 to rotate over the shoes 94 against the sheet flaps 23d.

After the folds 23c have been effected at the second folding station as above described, the partially wrapped package in the condition C is conveyed, as shown in FIG. 2, by the chains 58 and the roller units 56 to the lower portion of the first vertical leg of the U of the machine (indicated by the position D in FIG. 17) where the leading face 23f of the package engages a vertical transverse stop plate 107 secured to the side frame members 30 as shown in FIGS. 7 and 9 of the drawings. The position of the stop plate 107 may be varied by means of adjustable plates 107a. In this position and as shown in FIGS. 7 and 9 of the drawings, the package is supported on the roller units 56 and the chains 58 in elevated position over and out of contact with a plurality of rollers 108 and 109 rotatably mounted on axes parallel with the first vertical leg portion of the U and adapted to change the direction of movement of the package by a 90° turn for movement to the left along the lateral portion of the U. The rollers 108 and 109 are journalled at their ends in a vertically movable cross frame 110, the two spaced rollers 109 being power driven from an auxiliary electric motor 111 carried underneath the frame 110 and drivingly connected to the rollers 109 by a double pulley 112, belts 113, pulleys 114 and 116 and belts 117 to the rollers 109.

The vertically reciprocal frame 110 has vertical legs 120 secured at each end, as shown in FIGS 7 and 9, which extend downwardly for engagement at their lower ends with cams 121 fixed on a cross shaft 122 adjacent the ends thereof. The shaft 122 is journalled in bearing blocks 123 secured to the under sides of the lower side frame members 31 and on its outere right end; as viewed in FIG. 2 and shown in FIG. 7, there is fixed a sprocket 124 around which an endless chain 126 extends from another sprocket 127 fixed on the driving cross shaft 41. Thus, when the cross shaft 41 is rotated, the cross shaft 122 is also caused to rotate through its sprocket 127, chain 126 and sprocket 124 with the resulting rotation of cams 121 which effect raising and lowering of the roller carriage 110. The cams 121 are so positioned on the cross shaft 122 and their operation is so timed in relation with the other machine operations that when a partially wrapped package reaches the position D of FIG. 17 against the stop plate 107, the cams will be rotated to their high elevating position to raise the carriage 110 to the position shown in full lines of FIG. 7 and in broken lines in FIG. 9.

As the carriage 110 is raised, the rollers 108 and 109 will likewise be raised into engagement with the underside of the package which will then be elevated out of contact with the roller units 56 and the chains 58 upon further elevating movement. The rotation of the rollers 109 will then become effective to convey the package to the left as viewed in FIGS. 2 and 9 onto the top of freely rotatable rollers 128 on the left side of the lower end of the U. When the package shown at C in FIG. 17 passes from the folding shoes 94 at the second folding station to its position against the stop plate 107 and then changes its direction of movement and starts its passage along the lateral portion of the U, it passes under a pair of elongated brushes 129 having the flexible bristles thereof, bearing down on the top portion 23g of the paper sheet 23 so as to hold the portion 23g down as the package passes thereunder. The brushes 129 are supported by brackets 130 secured to and extending inwardly from the carriage 110 over the stop plate 107.

Referring more particularly to FIGS. 2 and 11 of the drawings, the conveyor mechanism of the lateral portion of the U of the wrapping machine is in alignment with the vertically movable rollers 108 and 109 and comprises an endless conveyor or belt 131 extending over pulleys 132 and 133 secured on shafts 134 and 136, respectively, journalled in bearings 137 mounted on the end legs 141 of this lateral conveyor section. The upper length of the belt 131 is supported by a plurality of spaced rollers 139 journalled at their ends in the side frame members 138 and the returning lower length of the belt rollers (not shown). The side frame members 138 are connected by transverse tie bars (not shown) and are supported at intervals by spaced posts 141. For driving the endless belt 131, a sprocket 142 secured on the outer end of the pulley shaft 136 is driven by a chain 143, also in engagement with a sprocket 144 on the output shaft 145a of a speed reducer 145. The speed reducer is driven from the main power shaft 26 by a chain 145b engaged with sprockets 145c and 145d carried on the input shaft 145e of the speed reducer 145 and the power shaft 26, respectively.

Above and inwardly of the right side frame member 138, as viewed in FIG. 10 and also shown in FIGS. 2 and 11, there is a vertical guide plate 146 supported from the side posts 141 and extending substantially the full length of one side of the lateral conveyor belt section. The right end 146a of the guide plate 146, as seen in FIG. 2, is curved away from the conveyor to provide a curved entry guide for the package as it enters onto the conveyor belt 131 from the rollers 138. The package, as it is carried by the conveyor belt 131, is adapted to remain in sliding contact with the guide plate 146 and to be properly positioned thereby. A horizontal pressure plate 147 extends inwardly over the conveyor belt 131 in spaced relation therefrom and likewise extends substantially the full length of the conveyor belt 131. The pressure plate 147 serves to exert a downward resilient pressure against the top flap 23g of the paper sheet 23 as it is being conveyed by the belt 131 along the lateral conveyor portion of the machine. The pressure plate 147 is supported on the lower ends of rods 149 depending from a plurality of upstanding and inwardly projecting posts 148 secured at spaced intervals to the vertical guide plate 146. Springs 150 are mounted on the rods 149 between fixed abutments 146b and the pressure plate 147 and thus urge the pressure plate 147 downwardly against the package as it passes thereunder.

The right end 147a of the pressure plate 147, as shown in FIGS. 2 and 9 of the drawings, is free and unsupported and is curved upwardly to facilitate entry of the package thereunder as it passes over the rollers 128. By means of the resilient pressure plate 147 the top flap portion 23g of the sheet 23 is tightly held down on top of the package throughout the entire length of the lateral conveyor system and assists in maintaining the paper sheet in proper folded position about the stack 22.

At the entry side of the conveyor belt apparatus opposite to the guide plate 146 and pressure plate 147 there is secured to the side frame member 138 a laterally extending and horizontally disposed grill 155 which is adapted to slidably receive and support the lower projecting flap 23b of the paper sheet as the package is moved initially by the conveyor belt. A spray gun 150a, shown diagrammatically in FIGS. 2 and 17 of the drawings, is positioned above the grill 155 and serves to apply a coating of glue to the outer edge of the flap 23b as shown in FIG. 17 at position E. A trip switch 151 projects through the side plate 146 and upon actuation thereof by engagement of the package therewith passing down the conveyor belt 131 a solenoid valve is actuated to permit operation of the glue gun 150a. The glue gun 150a ceases operation upon release of the switch 151 by passage of the package beyond the switch 151.

Extending forwardly to the left of the grill 155 and merging therewith in a horizontal plane is a folding plate 152 comprising sections 152a and 152b which curve upwardly from a horizontal plane at their right side adjacent the grill 155 to a vertical position at the point indicated by the numeral 153. This curved folding plate 152 is carried by supports 154 extending outwardly from the frame and serves to fold the flap 23b of the paper sheet from the horizontal position shown in position D to the upright position shown 23i at the right hand side of position E in FIG. 17. The condition of the paper flap 23b at position E in FIG. 17 is such that the left portion of the flap is still in horizontal position and the center portion of the flap is in the process of being folded up by the curved forming plates 152a and 152b while the right side of the flap is in perpendicular position and being so held by the perpendicular portion of the side plate at point 153.

The left end of the curved folding plate 152 is urged inwardly relative to the conveyor belt 131 by a spring-pressed push rod 156 mounted on a support plate 135 secured to the side frame member 138 and bearing against the outer face of the vertical portion of the folding plate 152. A spring 157 urges the push rod 156 inwardly against the forming plate 153. In normal position the upright portion of the forming plate at the point indicated by the numeral 153 extends slightly inwardly over the side edge of the conveyor belt 131 and is spaced from the guide plate 146 on the opposite side of the conveyor belt 131 a distance somewhat narrower than the width of the package passing along the conveyor belt. Thus, as a package is carried by the belt 131 and the flap portion 23b is folded to vertical position as above described, it will be tightly held against the side of the stack 22 in the upright position shown at E in FIG. 17, thus maintaining the paper in tight conformity to the stack. Beyond the point 153, the plate 152 continues throughout the remaining length of the conveyor belt 131 in parallel relation to the guide plate 146 on the opposite side thereof.

An annular revolvable disk 158 having a convex surface on its lower side is mounted for free rotation on a vertical post 159 and urged downwardly by a spring 160 against the top surface of the package adjacent the edge 23h thereof so as to assist in the forming of a creased edge. The horizontal pressure plate 147 is cut away as at 147b to permit the pressure disk 158 to engage the package as the package pushes the plate 147 upwardly.

In FIGS. 2 and 10 of the drawings, there is illustrated a reciprocating shoe 161 having an upwardly curved forward end 161a and adapted to be moved inwardly against the outer surface of the upstanding paper flap 23b and to fold it inwardly and downwardly over the package so that the glued portion 23i will overlap face downwardly into adhering relation on the upper surface of the paper flap 23g. This is the fourth folding operation. The reciprocating movement of the folding shoe 161 is quite rapid so as to securely fold down and adhere the paper flap 23b while the package is in movement on the conveyor belt. The folding shoe 161 is provided with upstanding brackets 162 which are pivotally mounted on a shaft 163 carried on the forward end of spaced arms 164, the arms being pivoted at 166 to spaced rocking levers 167. The left end of the shoe, as viewed in FIG. 10, is supported from pins 168 on the arms 164 by chains 169 and springs 170 extend between the arms 164 and rock levers 167 so as to exert a downward resilient pressure on the arms 164. The rock arms 167 are secured to a crossbar 171 extending therebetween, the crossbar having an inwardly extending plate 172 pivoted at its right end as at 173 to the outer end of a piston rod 174 of an air cylinder 176. The air cylinder 176 is pivoted as at 177 to a bracket 178 secured to the frame leg 141.

Extending inwardly through a slot in the guide plate 146 is another trip switch 179 which is adapted to be engaged by the leading edge of the package and to be tripped so as to actuate a solenoid valve which admits operating air pressure into the air cylinder 176 which will cause outward movement of the piston rod 74 and consequent inward movement of the folding shoe 161 to fold down the paper flap 23b over the top flap 23g. As shown in FIG. 10, the shoe 161 is in its flap folding position wherein the flap 23b has been folded down into adhering relation and the spring 170 is holding the shoe down tightly on the paper flaps. As the package passes beyond the trip switch 179 the solenoid valve is released and the piston rod 174 returns to its inward position, thus retracting the folding shoe 161 from its FIG. 10 position. As shown in FIG. 2, the shoe 161 is in its retracted position as indicated by the solid lines and as indicated by the broken lines it is in its projected paper folding position.

Upon retraction of the folding shoe 161 as above described, the package is now in the condition indicated by the package lettered F in FIG. 17 and the package is conveyed away from the fourth folding station by the conveyor belt 131 toward the end of the lateral conveyor portion of the apparatus at which point it enters onto the other vertical leg of the U-shaped machine wherein the remaining folding and gluing operations are performed. The conditions of the package in this last leg of the machine are indicated by the packages lettered F, G, H, and I in FIG. 17, the package lettered I being the final neatly folded and glued form.

The mechanism for performing the final gluing and folding operations of the final leg of the wrapping machine and the conveyor mechanism therefor are illustrated in FIGS. 11 to 16, inclusive, of the drawings. The frame of the final leg of the machine comprises upper and lower side frame members 180 and 181 which are secured together by transverse tie bars 182 and supported on spaced, vertical legs 183. The conveying apparatus comprises a plurality of spaced roller units 184 having rollers 186 and being supported on the transverse tie bars 182 of the frame. The roller units 184 extend from substantially one end of the final leg of the conveyor to the other end. The conveyor apparatus also comprises two spaced chains 187 which extend over spaced sprockets 188 fixed on a cross shaft 189 journalled in bearing blocks 190 on the side frame members 180 at the bottom of the leg of the U. The chains 187 extend in parallel relation to the upper end of the U and engage sprockets 189a fixed on a driving cross shaft 191 journalled in bearing members 192 mounted on the ends of the upper frame members 180, as shown in FIG. 15 of the drawings.

A sprocket 193 is fixed on the outer end of the driving cross shaft 191 and is driven by a chain 194 extending longitudinally along the outside of the conveyor system into engagement with a sprocket 196 fixed on the outer end of a transverse shaft 197, the latter being journalled in bearing blocks mounted on the lower side frame members 181 on each side of the conveyor. The cross shaft 197 inwardly of the right bearing block 198 as viewed in FIG. 11 has a gear 199 fixed thereto which is in mesh with a gear 200 fixed on the end of the main driving shaft 26 which is journalled in a bearing 201 also mounted on the right lower frame member 181. Thus, by the foregoing arrangement, upon rotation of the main driving shaft 26, the conveyor chains 187 having package engaging lugs 202 fixed thereon at spaced intervals are caused to continuously move longitudinally over this leg of the U, the chains 187 being driven through sprockets 189a, cross shaft 191, sprocket 193, elongated chain 194, sprocket 196, cross shaft 197 and gears 199 and 200. The chains 187 are in continuously conveying movement as long as the main driving shaft 26 is rotating.

A plurality of power driven rollers 203 and idler rollers 205 are journalled in a cross frame comprising parallel spaced side members 204 supported from the upper frame members 180. The rollers 203 are power driven by an auxiliary electric motor (not shown) which is drivingly connected thereto in a manner similar to the arrangement shown in FIG. 9 for driving the rollers 109. The upper peripheries of the driving rollers 203 form a package supporting platform which is in a plane slightly above the plane of the roller units 184 and the chains 187. The chain lugs 202, however, project above the plane of the rollers 203 and 205 so as to engage a package conveyed thereon and force the package forwardly along the final leg of the U on the roller units 184.

As shown in FIG. 11 of the drawings, extending transversely of the final leg of the conveyor adjacent the rollers 203 is a vertical guide plate 206 carried on horizontally adjustable supporting members 207 mounted on the upper side frame members 180. The guide plate 206 is in alignment with the guide plate 146 of the conveyor belt section of the machine so that a package may readily pass from the conveyor belt 131 onto the freely rotating rollers 208 and thence onto the power driven rollers 203, the side of the package 23f being in sliding engagement therewith. An adjustable stop plate 195 is supported by the frame adjacent the left roller unit 184 as viewed in FIG. 11 and serves to stop the package at the end of its lateral run on the rollers 203 and 205. Adjusting plates 195a engage the plate 195 and may move the same to adjust the machine for wrapping packages of different sizes.

It is to be noted that the rollers 208, 203 and 205 are mounted on horizontal axes which are disposed at angles less than right angles with respect to the side frames 204 of the roller carriage. This angular mounting of the rollers 208, 203 and 205 causes a package when it passes thereon from the conveyor belt 131 to be forced against the guide plate 206 because the rotative action of the rollers 203 and 208 is angularly towards the guide plate 206. The foregoing arrangement of the rollers insures that the package will be properly positioned in the final leg of the conveying apparatus of the wrapping machine so that the wrapping and gluing functions may be performed with precision by the mechanism to be described hereinafter.

When a package in the condition indicated by the letter F in FIG. 17 of the drawings is forced onto the rollers 208 and over those rollers onto the rollers 203 by the conveyor belt 131, the side 23f of the package is engaged by the lugs 202 of the conveyor chains 187 and moved off the rollers 203 onto the roller units 184. As shown in particular in FIGS. 11 and 12 of the drawings, a heavy rubber pressure roller 209 then engages the upper surface of the package as the package is conveyed therebeneath. The pressure roller 209 is provided with a shaft 210, the respective ends of which are freely rotatable in bearings 211 in the left ends of the arms 212 supported intermediate their ends by a crossbar 213 and at their other ends on upstanding posts 214 secured to the side frame members 180.

As the package is passing out from underneath the pressure roller 209, the leading edge of the package with the paper flap portion 23j projecting outwardly beyond the respective sides of the stack 22 engages the folding shoes 216 (see FIGS. 11 to 14, inclusive) disposed on each side of the conveyor system and having pressure rollers 217 and 218 rotatably mounted above and below the folding shoes in a manner similar to that described above with respect to the folding shoes 94 and rollers 102 and 103 at the second folding station of the first leg of the machine. The upper pressure rollers 217 are mounted on the left ends of the arms 219, as viewed in FIG. 14, which are pivoted intermediate their ends at 220 to the triangular plates 215 carried by the posts 214 and engageable at their opposite ends with the underside of the crossbar 213. The crossbar 213 is provided with adjustable stop members 221 by which the degree of rocking movement of the pivoted arm 219 may be adjusted. The lower rollers 218 are swingably mounted on arms 221 pivoted at 222 to the upper side frame members 180 and are urged upwardly into pressing engagement with the underside of the folding shoes 216 by springs 223.

Similar to the folding shoes 94 of the second folding station, the folding shoes 216 are inwardly tapered as at 216a and upwardly and downwardly tapered as at 216b and 216c. The folding shoes 216 are also swingably mounted on the ends of the brackets 224 which are pivoted on upstanding posts 226 carried by the upper side frame members 180. The brackets 224 and the shoes 216 are urged inwardly toward the center of the conveyor system by springs 227 and the extent of such inward swinging movement is limited by engagement of short levers 228 at the ends of the brackets 224 with adjustable stops 229 carried by the side frame members 180.

As the package in the condition indicated by the letter F in FIG. 17 of the drawings passes into the fifth folding station, the tapered and inclined surfaces 216a and 216b and 216c of the folding shoes 216 engage the projecting flap portions 23j on each side of the package and cause them to be folded inwardly against the side edges of the stack 22 as shown by the package lettered G in FIG. 17. As the package continues its movement after the fold 23j has been made, the upper flap portions 23d and 23k extend over the upper surfaces of the folding shoes 216 and the lower flap portions 23e extend on the undersides thereof where these flap portions are engaged by the pressure rollers 217 and 218 and the edges of the flaps are creased thereby. The extent of inward throw of the folding shoes 216 is to such a degree that the space between the respective shoes is narrower than the width of the package with the result that when the package passes therethrough, the end fold of the paper portion 23j is accomplished under resilient pressure.

A fifth folding station is also shown in FIGS. 11 to 14, inclusive, of the drawings immediately following the pressure rollers 217 and 218. This fifth station comprises upper folding plates 231 on each side of the conveyor having upwardly curved free inlet ends 231a and mounted in alignment with the side edges of the package. The folding plates are supported from horizontal spaced rods 232 carried by fittings 235 and urged inwardly of the conveyor by springs 234. The fittings 235 are slidably mounted on vertical supporting posts 233 secured to the upper side frame members 180 and springs 236 carried on the posts 233 urged the fittings downwardly. Thus, the folding plates 231 are spring urged inwardly and downwardly so as to maintain a tight folding contact with the paper sheet and the package as the upper projecting flaps 23d and 23k are being folded down. The folding plates 231 are substantially horizontal and in substantially one plane at their entry points 231a but gradually change in form to angular plates in two planes disposed at substantially 90° to each other. Thus, as the projecting flaps 23d and 23k first engage the elevated entry end 231a of the folding plates 231 they are in horizontal position but as the package is conveyed further along the final leg of the conveyor and further into the folding plates 231, they become folded down at right angles to the top of the package along the side edges of the stack in the manner shown by the package indicated by the letter H in FIG. 17 of the drawings. In folded down position, the upper horizontal portions of the plates 231 press downwardly on the top side edges of the package and the vertical portions of the plates 231 press inwardly against the folded down flaps 23d and 23k. For the purpose of folding up the lower projecting flaps 23e and 23l there are provided below the upper folding plates 231 lower folding plates 238 having downwardly and substantially horizontally disposed entry ends 238a. As shown more particularly in FIGS. 12 and 14 of the drawings, the lower folding plates 238, similarly to folding plates 231, change in form from the substantially open and flat shape at their entry ends 238a to angular plates in two planes at right angles to each other whereby the lower projecting flaps 23e and 23l may be folded up at right angles against the sides of the stack 22 as the package passes by the plates. The lower folding plates 238 are supported adjacent their flared ends 238a on the end of arms 239 pivoted at 240 to mounting plates 245 projecting inwardly from the upper side frame members 180. Springs 241 secured on the pivots 240 urge the arms 239 and consequently the folding plates 238 inwardly of the conveyor. The other ends of the lower folding plates 238 are also pivotally supported on the ends of arms 242 pivoted at 243 to mounting plates carried on the side frame members 180. The arms 242 are likewise urged inwardly of the conveyor by springs 244 carried on the pivots 243.

Thus, both the upper and lower folding plates 231 and 238 on one side of the conveyor are spaced in normal position from the corresponding plates 231 and 238 on the other side of the conveyor a distance less than the width of the package so that when the package enters between these folding plates the folding plates will exert a folding pressure as well as a sealing pressure against the adhesive material applied to the lower flap. The arms 239 and 242 carrying the lower plates 238 have stop bars 239a and 242a fixed on their ends at the pivots which engage adjustable stops 239b and 242b, respectively, by which the inward pressure of the plates may be varied.

As shown diagrammatically in FIGS. 11, 12 and 14 of the drawings, glue applying spray guns 246 are positioned on each side of the machine at points just prior to the entry 238a of the lower folding plates 238. Glue is thus applied to the lower flap and by reason of the fact that the upper flaps 23d and 23k arrive at their folded down position first, the lower flap portions 23e and 23l with the glue applied thereto are folded upwardly on the outside of the upper flaps.

The projecting flaps 23d—23k and 23e—23l folded by the folding plates 231 and 238 over and on the outside of elongated vertical flexible plates 230 on each side of the conveyor. The plates 230 are free at their left ends as viewed in FIG. 14 and secured at their other ends to the faces of the folding shoes 216. The flexible plates 230 serve as smooth pressure surfaces between the end flaps and the somewhat roughened surface formed by the end edges of the stack against which the folding plates 231 and 238 may resiliently press the folded flaps to complete a neat fold and to press the lower glued flap against the outer surface of the upper flap. As the package is conveyed by the chains 187 the package moves relative to the flexible pressure strips 230 and finally the strips will slide out from under the folds of the package and be free thereof.

After the paper sheet 23 is finally wrapped and folded about the stack 22 in the manner indicated by the letter I in FIG. 17, it is necessary that continued pressure be applied against the end flaps 23d and 23k and 23e and 23l on each side of the package for a sufficiently long period of time to properly seal the lower end flap against the upper end flap. To this end there is provided along the final run of the conveyor beyond the folding plates 231 and 238, end pressure means on each side of the conveyor adapted to bear inwardly under relatively great pressure against the end flaps. As shown more particularly in FIGS. 12, 15 and 16 of the drawings, these end pressure means comprise two endless V-belts 247 and 248 which are arranged one above the other and are adapted to extend around double-grooved pulleys 249 and 250 secured on vertical shafts 251 and 252, respectively. The shafts 252 on each side of the machine are mounted in bearing members 253 carried on the right ends of elongated plates 254 pivoted at their left ends around the shafts 251. Spring 256 extends between one of the conveyor roller units 184 and points 257 adjacent the right end of the pivoted plates 254, the plates 254 thereby being spring urged inwardly along with the mechanism to be described hereinafter which is mounted thereon, into the path of movement of the folded package.

The pulley shafts 251 extend downwardly through the upper side frame members 180 and on their lower end are provided with bevel gears 258 in meshed engagement with bevel gears 259 fixed on a cross shaft 260 having a sprocket 261 on the end thereof engaged by a chain 262 extending over a sprocket 263 fixed on the driving shaft 191. Thus, upon rotation of the driving shaft 191, the double pulleys 249 and 250 and the V-belts will be caused to rotate through the sprocket 263, chain 262, sprocket 261, cross shaft 260, bevel gears 258 and 259, and shafts 251.

The upper and lower V-belts 247 and 248, respectively, of each end pressure unit are engaged on their inner surfaces by a plurality of pulleys 264 and 266, respectively, the pulleys 264 and 266 being supported in different planes. The pulleys 264 and 266 are rotatably mounted on upstanding stub shafts 267 and 268, respectively, these shafts being vertically mounted on the ends of lever arms 269 pivotally mounted on vertical pins 270 extending upwardly in spaced relation from the swing plate 254. Levers 271 having adjustable stops 271a are fixed on the ends of the lever arms 269 and are engaged by adjustable tension springs 272 at their outer ends, the springs being secured to pins 275 carried by the upper frame members 180. The springs 272 are adapted to rock the pulleys 264 and 266 into engagement with the V-belts so as to exert an expanding or widening pressure against the V-belts and force them into pressing engagement with the end flaps of the package and the spring 256 also exerts an inward pressure on the swing plates 254 which carries the resilient V-belt mechanism. Although in FIG. 15 of the drawing only one edge pressure means comprising the V-belts and the pulleys is shown in detail, it is to be understood that the same construction is repeated on the other side of the conveyor so that pressure will be exerted equally on each of the ends of the package.

By the foregoing arrangement, after the glue has been applied to the lower flap 23l and 23e of the package and the lower flap has then been folded upwardly into tight engagement with the folded down upper flap on the ends of the package, the conveyor moves the package and particularly the end surfaces thereof into engagement with the V-belts 247 and 248 which apply pressure to the lower flap to hold the glued portions thereof in tight engagement until sufficiently sealed. The spring tension of the spring 256 is so adjusted by the adjusting means 256a on the roller unit 184 that the space between the V-belts is somewhat less than the width of the package to be passed therebetween. The resilient mounting of the swing plate 254 and the resilient mountings of the pulleys and V-belts results in the V-belts applying a resilient pressure against the glued flaps throughout the entire time that the package is being conveyed between the V-belts and thus by the time the package reaches the ends of the V-belts and the top of the leg of the U of the machine, the package has been perfectly wrapped and sufficiently sealed so that it can be removed at the end of the machine.

In FIGURES 18 to 21, inclusive, of the drawings, there is shown a modified form of shoe mechanism for accomplishing the fourth folding operation whereby the glued portion 23b is forced down into adhering relation on the upper surface of the paper flap 23g as the package passes along the horizontal portion of the U of the machine. In this modified form, the reciprocating folding shoe 300 is so mounted and arranged that its height is automatically adjusted in accordance with the thickness of the stack of shingles or object being wrapped so that the shoe 300 will always be at the proper level with respect to the package as it is moved into folding engagement therewith.

As shown more particularly in FIGS. 18 and 19, the shoe 300 at its front is upwardly curved as at 301 and is tapered rearwardly somewhat from its center toward its outer edges so as to be somewhat plow shaped. A vertical plate 302 is secured to the shoe 300 at its front end and pivotally secured to this plate 302 at its upper portion is the bifurcated end 303 of a piston rod 304 reciprocal relative to an air cylinder 306. The air cylinder 306 is pivoted at its rear end to a bracket 307 extending inwardly from a frame member 308 bolted to spaced, transversely extending frame members 309. Actuation of the air cylinder will effect reciprocation of the shoe 300 similar to the action of the shoe 161 and for a similar purpose.

The shoe 300 is supported by rollers 310 which engage the under surface of the shoe at its side edges intermediate the ends thereof. The rollers 310 are carried on the upper ends of levers 311 fixed to a rock shaft 312 journaled in the transverse frame members 309. On the left outer end of the shaft 312 a lever 313 is secured for movement therewith and a pair of spaced arms 314 are pivotally secured thereto at their lower ends and to a depending bracket 316 carried on the under side of a transversely extending tiltable arm 317. The arm 317 is pivoted at one end as at 319 to an upstanding bracket 318 carried by the frame member 308 and at its other free end carries a vertically adjustable depending rod 320, the lower end of which rests upon and engages the upper surface of the vertically movable pressure plate 147 which bears downwardly against the top of the package as it passes thereunder.

Thus, when a package is moved on the conveyor under the pressure plate 147, the pressure plate 147 will be raised as previously described herein and thus the free end of the tiltable arm 317 will be raised through the rod 320. As the arm 317 is raised, the vertical spaced arms 314 are commensurately raised so as to rock the short lever 313 and then the longer lever 311 through the shaft 312. As the lever 311 is rocked, its upper end will be raised carrying the rollers 310 and hence the shoe 300 will be raised to a more elevated position so that as it is moved toward the package the lower front portion of the shoe 300 will engage the upper edge of the package at the proper angle to insure a smooth even fold of the paper wrapping. It is thus evident that the degree of elevation of the shoe 300 as above described is controlled automatically by the thickness or height of the package passing under the pressure plate 147.

In order to guide the shoe 300 for straight line reciprocation, rollers 321 (FIGS. 20 and 21) are rotatably carried by brackets 322 projecting outwardly from the top of the rearward ends of the vertical side plates 300a of the shoe 300, these rollers 321 on vertical axes being adapted to rollably engage the vertical faces of guide plates 323 secured to the transverse frame members 309 on each side of the shoe.

A cross shaft 324 extends between and projects beyond the shoe side plates 300a and on each outer end of the shaft are secured rollers 326 which roll on the upper surfaces of trackways 327 of the guide plates 323. Pinions 328 are keyed to the shaft 324 adjacent each roller 326 and mesh with racks 329 on the guide plates. By the foregoing arrangement of parts, the reciprocable shoe 300 is confined and guided at its upper and rearward portions and as the shoe 300 is reciprocated by the air cylinder 306, the shaft 324 will be rotated by rotation of the pinions 328 relative to the rack 329 and the end rollers 326 also will be caused to rotate over the trackways 327. Since the shaft 324 and the guiding and supporting mechanism are positioned at the rearward end of the shoe 300, the shoe 300 can therefore be tilted up and down at its forward portion by the raising and lowering of the supporting rollers 310, the tilting action of the shoe being about the shaft 324 as the pivot point.

From the foregoing description it will be apparent that the present invention provides an automatic wrapping machine by which an object in the shape of a rectangular parallelepiped, such as a stack of shingles, may be rapidly and neatly wrapped by wholly enclosing the same in a protective sheet such as heavy paper. The folds are made progressively and adhesive material is applied as the object and the protective wrapping sheet pass through the machine, the direction of movement of the object being changed from time to time to accomplish the folds in sequence on the different surfaces of the object. From beginning to end, the operation is entirely automatic and no manual operation or attention by an operator is required.

Although a preferred embodiment of the present invention has been described above and shown in the accompanying drawings, it is to be understood that changes and modifications may be made in the details of structure and operation thereof without departing from the spirit and scope of the appended claims.

We claim:

1. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, means for changing the direction of movement of said object on said conveyor approximately 90°, a third folding means on one side of said conveyor for engaging the lower flap of said sheet projecting laterally from underneath the other side of said object and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, means for changing the direction of movement of said object on said conveyor approximately 90° to a direction opposite to the initial direction of movement of said object, second shoe means on each side of said conveyor comprising a fifth folding means and adapted to engage the now leading vertical portions of said sheet projecting laterally from the respective ends of said object and to fold said vertical portions inwardly against the respective ends of said object, and sixth and seventh folding means on each side of said conveyor for engaging said upper and lower end flaps projecting laterally from the ends of said object and for folding the same downwardly and upwardly one over the other.

2. A wrapping machine as set forth in claim 1 wherein said folding shoes are yieldably mounted for movement inwardly of the conveyor and adapted to project partially into the path of movement of said object to exert a resilient pressure against portions of the paper sheet during their folding engagement therewith.

3. A wrapping machine as set forth in claim 1 wherein the said third folding means comprises a forming plate disposed in a substantially horizontal position at its lead-in end and then curves into a vertical plane and said plate being resiliently urged into the path of movement of said object to exert a folding and holding pressure against the portion of the sheet engaging said other side face of said object.

4. A wrapping machine as set forth in claim 1 wherein said folding shoes of said second and fifth folding means are of substantially the same height as the object being wrapped and comprise tapered faces extending inwardly of the conveyor and downwardly and upwardly in the direction of movement of said object.

5. A wrapping machine as set forth in claim 1 wherein said folding shoes of said second and fifth folding means are of substantially the same height as the object being wrapped and comprise tapered side faces extending inwardly of the conveyor and a pair of pressure rollers yieldably supported above and below said shoes in rolling contact with the upper and lower surfaces thereof whereby the horizontal flaps of said sheet projecting from the ends will pass between said rollers and said shoes.

6. A wrapping machine as set forth in claim 1 wherein said means for supporting a protective sheet in a plane at substantially right angles to the path of movement of said object includes a means for holding the lower portion of said sheet in an arcuate shape.

7. A wrapping machine as set forth in claim 1 wherein said sixth and seventh folding means comprise upper and lower forming plates on each side of the conveyor disposed in substantially horizontal planes at their lead-in ends and then curve into angular plates having horizontal and vertical plate portions adapted to engage and fold said upper and lower projecting end flaps downwardly and upwardly, respectively, upon passage of said object thereby, said upper and lower forming plates being resiliently and yieldably urged downwardly and upwardly, respectively, into the path of movement of said object to exert folding and holding pressure against the marginal end edges of the upper and lower surfaces and against the end flaps of said sheet.

8. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, means for changing the direction of movement of said object on said conveyor approximately 90°, a third folding means on one side of said conveyor for engaging the lower flap of said sheet projecting laterally from underneath the other side of said object and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, means for changing the direction of movement of said object on said conveyor approximately 90° to a direction opposite to the initial direction of movement of said object, second shoe means on each side of said conveyor comprising a fifth folding means and adapted to engage the now leading vertical portions of said sheet projecting laterally from the respective ends of said object and to fold said vertical portions inwardly against the respective ends of said object, sixth and seventh folding means on each side of said conveyor for engaging said upper and lower end flaps projecting laterally from the ends of said object and for folding the same downwardly and upwardly one over the other, and means for applying pressure against the folded end flaps on each end of the object to seal the same.

9. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, means for changing the direction of movement of said object on said conveyor approximately 90°, means for applying an adhesive material to the lower flap of said sheet projecting laterally and horizontally from underneath the other side of said object, a third folding means on one side of said conveyor for engaging said lower laterally projecting flap of said sheet and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, means for changing the direction of movement of said object on said conveyor approximately 90° to a direction opposite to the initial direction of movement of said object, second shoe means on each side of said conveyor comprising a fifth folding means and adapted to engage the now leading vertical portions of said sheet projecting laterally from the respective ends of said object and to fold said vertical portions inwardly against the respective ends of said object, sixth and seventh folding means on each side of said conveyor for engaging said upper and lower end flaps projecting laterally from the ends of said object and for folding the same downwardly and upwardly one over the other, means for applying an adhesive material on one of the end flaps on each side of said object prior to said latter folding operation, and means for applying pressure against the folded end flaps on each end of the object to seal the same.

10. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, pressure means supported above and below said shoe means for applying pressure on the upper and lower end flaps projecting laterally on each side of said object between said pressure means and said shoe means to crease the edges of said leading flaps, means for changing the direction of movement of said object on said conveyor approximately 90°, means for applying an adhesive material to the lower flap of said sheet projecting laterally and horizontally from underneath the other side of said object, a third folding means on one side of said conveyor for engaging said lower laterally projecting flap of said sheet and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, means for changing the direction of movement of said object on said conveyor approximately 90° to a direction opposite to the initial direction of movement of said object, second shoe means on each side of said conveyor comprising a fifth folding means and adapted to engage the now leading vertical portions of said sheet projecting laterally from the respective ends of said object and to fold said vertical portions inwardly against the respective ends of said object, pressure means supported above and below said shoe means for applying pressure on the upper and lower end flaps projecting laterally from said object between said pressure means and said shoe means, sixth and seventh folding means on each side of said conveyor for engaging said upper and lower end flaps projecting laterally from the ends of said object and for folding the same downwardly and upwardly one over the other, means for applying an adhesive material on one of the end flaps on each side of said object prior to said latter folding operation, and means for applying pressure against the folded end flaps on each end of the object to seal the same.

11. A wrapping machine as set forth in claim 10 wherein said means on each side of said conveyor for applying pressure against the folded end flaps on each end of the object to seal the same comprises an elongated belt supportingly engaged by and urged into the path of movement of said object by a plurality of yieldably mounted, spring-pressed pulleys.

12. A wrapping machine as set forth in claim 10 wherein said means on each side of said conveyor for applying pressure against the folded end flaps on each end of the object to seal the same comprises an elongated belt supportingly engaged by and urged into the path of movement of said object by a plurality of yieldably mounted, spring-pressed pulleys, said belt being engaged and driven by a power driven pulley at the same rate of speed as said conveyor, and said plurality of pulleys and said belt being mounted on a swingable arm resiliently urged into the path of movement of said object.

13. A machine for wrapping an object having generally the shape of a rectangular parallelepiped with a protective sheet by a plurality of consecutive wrapping operations comprising a U-shaped conveyor apparatus for supporting and moving said object being wrapped and adapted to convey said object in a plurality of directions down one leg of the U to the bottom thereof, laterally across the bottom of said U and then up the other leg of the U to the end thereof during said wrapping operations, means for supporting a protective sheet intermediate the ends of said one leg of said conveyor in a plane at substantially right angles to the path of movement of said object as it passes down said one leg of the conveyor and adapted to release said sheet upon engagement of the leading side of said object with said sheet intermediate its edges, said sheet being of greater size than the width, height and length of said object, means on said one leg of the conveyor engageable with the upwardly projecting portion of said sheet for folding the same down on the upper surface of said object, shoe means on each side of said one leg of the conveyor comprising a second folding means adapted to engage the leading vertical portions of said sheet projecting laterally from the respective ends of said object and to fold the said vertical portions inwardly against the respective ends of said object, means for changing the direction of movement of said object on said conveyor approximately 90° for movement along said bottom of the U of the conveyor, a third folding means on one side of said bottom of the U of said conveyor for engaging the lower flap of said sheet projecting laterally from underneath the other side of said object and for folding the same to a vertical position to cause said flap to engage and project upwardly above the vertical face of said other side, a fourth folding means mounted on said one side of said bottom of the U of said conveyor and movable across the path of movement of said object for engagement with said upwardly projecting flap and for folding the same down on top of said object and said previously folded portion of said sheet, means for changing the direction of movement of said object on said conveyor approximately 90° to a direction opposite to the initial direction of said object for passage thereof up the other leg of the conveyor, second shoe means on each side of said other leg of the conveyor comprising a fifth folding means and adapted to engage the now leading vertical portions of said sheet projecting laterally from the respective ends of said object and to fold said vertical portions inwardly against the respective ends of said object, and sixth and seventh folding means on each side of said other leg of the conveyor for engaging said upper and lower end flaps projecting laterally from the ends of said object and for folding the same downwardly and upwardly one over the other.

14. A wrapping machine as set forth in claim 13 wherein the conveyor apparatus of the first leg of the U comprises spaced moving endless chains extending to said paper supporting means and having upstanding lugs carried thereby and engageable with the trailing side face of the object, spaced moving endless chains extending from said paper supporting means to the bottom of the leg of said U and pressure means engageable with the top surface of said object for urging said object into frictional engagement with said latter chains; the conveyor apparatus of the bottom of the U of the machine comprises a conveyor belt for conveying said partially wrapped object and sheet from said first leg to the other leg of the U, and the conveyor apparatus of the other leg of the U of the machine comprises spaced moving endless chains having upstanding lugs carried thereby and engageable with the other sheet-covered side face of said object.

15. A wrapping machine as set forth in claim 13 wherein the first means for changing the direction of movement of said object on said conveyor apparatus approximately 90° comprises a vertically reciprocable conveyor unit at the bottom of the said one leg of the U of the machine and normally disposed in a substantially horizontal plane below the conveyor apparatus of said one leg and adapted to be raised to a plane thereabove in substantial horizontal alignment with the end of the conveyor apparatus of the bottom of the U of the machine and said conveyor unit having driven conveying means for moving said object onto said conveyor apparatus of the bottom of the U of the machine.

16. A wrapping machine as set forth in claim 13 wherein at the bottom of the other leg of the U of the conveyor there are means for positioning said partially wrapped object in proper alignment with respect to the said other leg, said means comprising an upstanding positioning and guide member extending transversely across the bottom of the U of the machine and adapted to be engaged by the one side face of the partially wrapped object as said object moves from the conveyor apparatus of the bottom of the U of the machine and driven conveying means movable in a direction angularly toward said positioning member whereby said object will be caused to be moved toward and along said member in intimate aligned position thereagainst.

17. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, means for changing the direction of movement of said object on said conveyor approximately 90°, a third folding means on one side of said conveyor for engaging the lower flap of said sheet projecting laterally from underneath the other side of said object and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, pressure and guide means extending along the other side of said conveyor opposite to said third and fourth folding means and adapted to engage and press said folded portion of the sheet against said initial leading side of said object and to press said object against said third folding means, means for changing the direction of movement of said object on said conveyor approximately 90° to a direction opposite to the initial direction of movement of said object, second shoe means on each side of said conveyor comprising a fifth folding means and adapted to engage the now leading vertical portions of said sheet projecting laterally from the respective ends of said object and to fold said vertical portions inwardly against the respective ends of said object, and sixth and seventh folding means on each side of said conveyor for engaging said upper and lower end flaps projecting laterally from the ends of said object and for folding the same downwardly and upwardly one over the other.

18. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet in a plane at substantially right angles to the path of movement of said object and adapted to release said sheet upon engagement of the leading side of said object with said sheet intermediate its edges, said sheet being of greater size than the width, height and length of said object, means engageable with the upwardly projecting portion of said sheet for folding the same down on the upper surface of said object, shoe means on each side of said conveyor comprising a second folding means adapted to engage the leading vertical portions of said sheet projecting laterally from the respective ends of said object and to fold the said vertical portions inwardly against the respective ends of said object, a third folding means on one side of said conveyor for engaging the lower flap of said sheet projecting laterally from underneath the other side of said object and for folding the same to a vertical position to cause said flap to engage and project inwardly above the vertical face of said other side of said object and to form unfolded vertical portions projecting laterally from the respective ends of said object, a fourth folding means mounted on said one side of said conveyor and movable across the path of movement of said object for engagement with said upwardly projecting flap and for folding the same down on top of said object and said previously folded portion of said sheet, second shoe means on each side of said conveyor comprising a fifth folding means and adapted to engage the said unfolded vertical portions of said sheet projecting laterally from the respective ends of said object and to fold said vertical portions inwardly against the respective ends of said object, and sixth and seventh folding means on each side of said conveyor for engaging said upper and lower end flaps projecting laterally from the ends of said object and for folding the same downwardly and upwardly one over the other.

19. A wrapping machine as set forth in claim 1 wherein the folding means of the fourth folding operation comprises a reciprocable folding shoe normally out of the path of movement of said upwardly projecting flap of the protective sheet and movable into said path of movement into engagement with said flap and over the top of said object being wrapped whereby said flap is folded down against the top surface of said object, means for supporting said shoe for reciprocating movement and means for effecting reciprocating movement of said shoe upon passage of said partially wrapped object thereby.

20. A wrapping machine as set forth in claim 1 wherein the folding means of the fourth folding operation comprises a reciprocable shoe normally out of the path of movement of said upwardly projecting flap of the protective sheet and movable into said path of movement into engagement with said flap and over the top of said object being wrapped whereby said flap is folded down against the top surface of said object, means for supporting said shoe for said reciprocating movement and means for raising or lowering said shoe supporting means in accordance with the thickness of said object.

21. A wrapping machine as set forth in claim 1 wherein a vertically yieldable and movable pressure plate is positioned at one side of said conveyor at said fourth folding means and is adapted to engage the top surface of said object being wrapped and to assume various elevated positions in accordance with the thickness of the said object, and said fourth folding means comprises a reciprocable shoe normally out of the path of movement of said upwardly projecting flap of said protective sheet and movable into said path of movement into engagement with said flap and over the top of said object being wrapped whereby said flap is folded down against the top surface of said object, means for supporting said shoe for reciprocating movement and means operably connected between said pressure plate and said shoe supporting means whereby raising or lowering movement of the pressure plate will cause raising or lowering movement of the shoe supporting means in accordance with the thickness of the said object being wrapped to properly position said shoe relative to said object.

22. A wrapping machine as set forth in claim 1 wherein said folding shoes of said second and fifth folding means are of substantially the same height as the object being wrapped and comprise tapered side faces extending inwardly of the conveyor, a pair of pressure rollers are yieldably supported above and below said shoes in rolling contact with the upper and lower surfaces thereof whereby the horizontal flaps of said sheet projecting from the ends will pass between said rollers and said shoes, and means are provided for rotating each of said pressure rollers comprising a rubber roller adjacent to each said pressure roller and drivingly connected therewith and engageable with the surfaces of said object whereby movement of said object will rotate said rubber rollers to drive said pressure rollers.

23. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet across the path of movement of said object and adapted to release said sheet upon engagement of the leading side of said object with said sheet intermediate its edges, said sheet being of greater size than said object, means engageable with the upwardly projecting portion of said sheet for folding the same down on the upper surface of said object, a second folding means on each side of said conveyor adapted to engage the leading vertical portions of said sheet projecting laterally from the respective ends of said object and to fold the said vertical portions inwardly against the respective ends of said object, means for changing the direction of movement of said object on said conveyor, a third folding means on one side of said conveyor for engaging the lower flap of said sheet projecting laterally from underneath the other side of said object and for folding the same to a vertical position to cause said flap to engage and project upwardly above the vertical face of said other side of said object, a fourth folding means mounted on said one side of said conveyor and movable across the path of movement of said object for engagement with said upwardly projecting flap and for folding the same down on top of said object and said previously folded portion of said sheet, means for again changing the direction of movement of said object on said conveyor, a fifth folding means on each side of said conveyor adapted to engage the now leading vertical portions of said sheet projecting laterally from the respective ends of said object and to fold said vertical portions inwardly against the respective ends of said object, and sixth and seventh folding means on each side of said conveyor for engaging said upper and lower end flaps projecting laterally from the ends of said object and for folding the same downwardly and upwardly one over the other.

24. A machine for wrapping an object having generally the shape of a rectangular parallelepiped with a protective sheet by a plurality of consecutive wrapping operations comprising a conveyor apparatus for supporting and moving said object being wrapped and adapted to convey said object in a plurality of directions during said wrapping operations, means for supporting a protective sheet across the path of movement of said object and adapted to release said sheet upon engagement of the leading side of said object with said sheet intermediate its edges, said sheet being of greater size than said object, means engageable with the upwardly projecting portion of said sheet for folding the same down on the upper surface of said object, shoe means on each side of said conveyor comprising a second folding means on each side of said conveyor adapted to engage the leading vertical portions of said sheet projecting laterally from the respective ends of said object and to fold the said vertical portions inwardly against the respective ends of said object, a third folding means on one side of said conveyor for engaging the lower flap of said sheet projecting laterally from underneath the other side of said object and for folding the same to a vertical position to cause said flap to engage and project inwardly above the vertical face of said other side of said object and to form unfolded vertical portions projecting laterally from the respective ends of said object, a fourth folding means mounted on said one side of said conveyor and movable across the path of movement of said object for engagement with said upwardly projecting flap and for folding the same down on top of said object and said previously folded portion of said sheet, a fifth folding means on each side of said conveyor adapted to engage the said unfolded vertical portions of said sheet projecting laterally from the respective ends of said object and to fold said vertical portions inwardly against the respective ends of said object, and sixth and seventh folding means on each side of said conveyor for engaging said upper and lower end flaps projecting laterally from the ends of said object and for folding the same downwardly and upwardly one over the other.

25. In a wrapping machine of the character described, folding mechanism for folding a protective sheet across the top surface of an object being wrapped comprising a generally vertically movable element operably engageable with the top surface of the object, a reciprocable folding shoe movable for engaging one end thereof with an upwardly projecting flap portion of the sheet for folding the latter inwardly and downwardly across the top surface of the object, rocker means supporting said shoe for pivotal movement about its opposite end, and means operably connecting said element with said rocker means whereby to effect raising or lowering of said one end of said shoe in accordance with the elevation of the top surface of the object as determined by said element.

26. The mechanism of claim 25 further characterized in that said last-named means comprises an elongated arm having said element depending from one end thereof, means pivotally supporting said arm at its opposite end, and operating connections between said arm and said rocker means whereby said shoe is pivotally moved in unison with pivotal movement of said arm.

References Cited in the file of this patent

UNITED STATES PATENTS

| | | |
|---|---|---|
| 2,324,401 | Kimball | July 13, 1943 |
| 2,716,852 | Kindseth | Sept. 6, 1955 |
| 2,810,466 | Ingram | Nov. 16, 1958 |